US011838440B2

(12) United States Patent
Broidy et al.

(10) Patent No.: US 11,838,440 B2
(45) Date of Patent: Dec. 5, 2023

(54) AUTOMATED SPEECH-TO-TEXT PROCESSING AND ANALYSIS OF CALL DATA APPARATUSES, METHODS AND SYSTEMS

(71) Applicant: LEO Technologies, LLC, Los Angeles, CA (US)

(72) Inventors: Elliott Broidy, Los Angeles, CA (US); James Sexton, Los Angeles, CA (US); Christian Wensel, Irvine, CA (US); Brennan Karrer, Irvine, CA (US)

(73) Assignee: LEO Technologies, LLC, Los Angeles, CA (US)

(*) Notice: Subject to any disclaimer, the term of this patent is extended or adjusted under 35 U.S.C. 154(b) by 0 days.

(21) Appl. No.: 17/676,676

(22) Filed: Feb. 21, 2022

(65) Prior Publication Data

US 2022/0182484 A1    Jun. 9, 2022

Related U.S. Application Data

(63) Continuation of application No. 16/986,006, filed on Aug. 5, 2020, now Pat. No. 11,258,895, which is a
(Continued)

(51) Int. Cl.
*H04M 3/22* (2006.01)
*G10L 15/26* (2006.01)
(Continued)

(52) U.S. Cl.
CPC .......... *H04M 3/2218* (2013.01); *G06F 16/64* (2019.01); *G06F 16/685* (2019.01); *G06F 16/687* (2019.01); *G10L 15/26* (2013.01)

(58) Field of Classification Search
CPC .... H04M 3/2218; G06F 16/687; G06F 16/64; G06F 16/685; G10L 15/26
(Continued)

(56) References Cited

U.S. PATENT DOCUMENTS 7,693,267 B2    4/2010  Howell et al.
7,805,457 B1    9/2010  Viola
(Continued)

*Primary Examiner* — Binh Kien Tieu
(74) *Attorney, Agent, or Firm* — Irell & Manella LLP

(57) ABSTRACT

The present invention discloses a system, apparatus, and method that obtains audio and metadata information from voice calls, generates textual transcripts from those calls, and makes the resulting data searchable via a user interface. The system converts audio data from one or more sources (such as a telecommunications provider) into searchable usable text transcripts. One use of which is law enforcement and intelligence work. Another use relates to call centers to improve quality and track customer service history. Searches can be performed for callers, callees, keywords, and/or other information in calls across the system. The system can also generate automatic alerts based on callers, callees, keywords, phone numbers, and/or other information. Further the system generates and provides analytic information on the use of the phone system, the semantic content of the calls, and the connections between callers and phone numbers called, which can aid analysts in detecting patterns of behavior, and in looking for patterns of equipment use or failure.

19 Claims, 19 Drawing Sheets

Related U.S. Application Data continuation of application No. 16/284,066, filed on Feb. 25, 2019, now Pat. No. 10,742,799.

(60) Provisional application No. 62/635,774, filed on Feb. 27, 2018.

(51) Int. Cl.
*G06F 16/64* (2019.01)
*G06F 16/683* (2019.01)
*G06F 16/687* (2019.01)

(58) Field of Classification Search
USPC ... 379/85, 88.08, 88.09, 88.11, 88.12, 88.14, 379/88.17, 88.18, 88.19, 88.21, 88.22, 379/88.25, 88.26, 112.01
See application file for complete search history.

(56) References Cited

U.S. PATENT DOCUMENTS

| | | | |
|---|---|---|---|
| 7,860,222 B1 | 12/2010 | Sidler et al. | |
| 8,140,392 B2* | 3/2012 | Altberg | G06Q 30/0241 379/112.01 |
| 8,380,485 B1 | 2/2013 | Callahan | |
| 8,447,285 B1* | 5/2013 | Bladon | H04M 7/0012 379/85 |
| 8,537,983 B1* | 9/2013 | Haggerty | G06F 3/167 379/265.06 |
| 9,009,047 B2 | 4/2015 | Hayakawa et al. | |
| 9,870,796 B2 | 1/2018 | Goldberg | |
| 10,742,799 B2 | 8/2020 | Broidy et al. | |
| 11,258,895 B2* | 2/2022 | Broidy | G06F 16/638 |
| 2007/0041545 A1 | 2/2007 | Gainsboro | |
| 2007/0204285 A1 | 8/2007 | Louw | |
| 2008/0243784 A1* | 10/2008 | Stading | G06F 16/3325 |
| 2009/0305683 A1 | 12/2009 | Gupta et al. | |
| 2011/0044447 A1 | 2/2011 | Morris | |
| 2011/0055098 A1 | 3/2011 | Stewart | |
| 2016/0012821 A1 | 1/2016 | Goldberg | |
| 2016/0050394 A1 | 2/2016 | Segal | |
| 2017/0104878 A1* | 4/2017 | Razzano | H04M 15/846 |
| 2017/0264753 A1 | 9/2017 | Rae et al. | |
| 2018/0260455 A1 | 9/2018 | Olligschlaeger | |
| 2018/0359293 A1 | 12/2018 | Faulkner | |
| 2019/0014207 A1 | 1/2019 | Volkart | |
| 2019/0124179 A1 | 4/2019 | Cunico et al. | |
| 2019/0312979 A1* | 10/2019 | Sharma | H04M 15/72 |
| 2019/0349478 A1 | 11/2019 | Conway et al. | |
| 2020/0366786 A1 | 11/2020 | Broidy et al. | |

* cited by examiner

AUTOMATED SPEECH-TO-TEXT PROCESSING AND ANALYSIS OF CALL DATA APPARATUSES, METHODS AND SYSTEMS

PRIORITY CLAIM AND RELATED APPLICATIONS

This application is a continuation of U.S. application Ser. No. 16/986,006, filed Aug. 5, 2020, entitled "AUTOMATED SPEECH-TO-TEXT PROCESSING AND ANALYSIS OF CALL DATA APPARATUSES, METHODS AND SYSTEMS", which is a continuation of U.S. application Ser. No. 16/284,066, filed Feb. 25, 2019, entitled "AUTOMATED SPEECH-TO-TEXT PROCESSING AND ANALYSIS OF CALL DATA APPARATUSES, METHODS AND SYSTEMS", which is a non-provisional of and claims priority under 35 U.S.C. § 119(e) to prior U.S. provisional application for patent Ser. No. 62/635,774, filed Feb. 27, 2018, entitled, "AUTOMATED SPEECH-TO-TEXT PROCESSING AND ANALYSIS OF CALL DATA APPARATUSES, METHODS AND SYSTEMS,". The entire contents of the aforementioned application are hereby expressly incorporated herein by reference.

FIELD

The present invention is directed generally to apparatuses, methods, and systems for automatically performing voice to text processing of audio calls and indexing such information into a searchable database to allow users to efficiently access and search such information via a user interface.

BACKGROUND

In law enforcement and intelligence work, gathering information from audio communications is useful in order to help prevent a crime or catch perpetrators. Furthermore, monitoring audio communications in applications such as help-lines or call centers may allow a business to quickly detect issues and follow up with employees and customers, increasing the chances for positive resolutions to problems. Various traditional methods for monitoring phone calls or other audio data are labor intensive, time consuming, and ineffective. For example, it is difficult and expensive for humans listening to phone calls or reviewing individual transcripts to connect information from calls that occur on different days or between different individuals. This process can be improved to reduce both time spent and expense. It would be useful to provide a method and system for processing audio data and indexing the audio data in a searchable database that can be searched using various tools.

DETAILED DESCRIPTION

The present invention discloses a system, apparatus, and method that obtains audio and metadata information from voice calls, generates textual transcripts from those calls, and makes the resulting data searchable and accessible via a user interface. The system converts audio data from one or more sources (such as a telecommunications provider) into searchable usable text transcripts. One use of which is law enforcement and intelligence work. In particular, the system is useful with respect to monitoring conversations by inmates in jails, prisons, correctional facilities, and the like.

Such phone calls are routinely recorded but cannot be efficiently utilized to obtain evidence or prevent crimes without the benefit of the system described herein.

Another use relates to call centers to improve quality and track customer service history. The advantage of the system is that calls are transcribed shortly after being completed between callers and callees (or multiple parties), and the transcription and other metadata regarding the calls are stored in a database in a searchable and indexed form. Users can perform searches for callers, callees, keywords, and/or other information in calls across the system. The system can also generate automatic alerts based on callers, callees, keywords, phone numbers, and/or other information. The alerts can be generated on the user interface, sent via email, and/o sent via text message.

For the purposes of this disclosure, "call data" may comprise "audio data." Call data may also comprise "call metadata." For example, call data may comprise, without limitation, audio data in the form of an audio track of a phone conversation between two or more individuals. Further, call metadata may comprise, for example, billing information, caller and callee identification, caller and callee phone number, location information, call start time and end time, and call duration. Where an embodiment is described in terms of call data or call metadata, the invention may also apply to other audio data and audio metadata. All embodiments are exemplary and in no way limit the invention.

The present invention relates to a method, apparatus, and system (hereinafter also referred to as "speech-to-text system") that transform audio data, typically taken from voice calls between multiple parties, into indexed and searchable text, and stores the information in a database that can be searched using various searching tools and methods.

Figure 1:
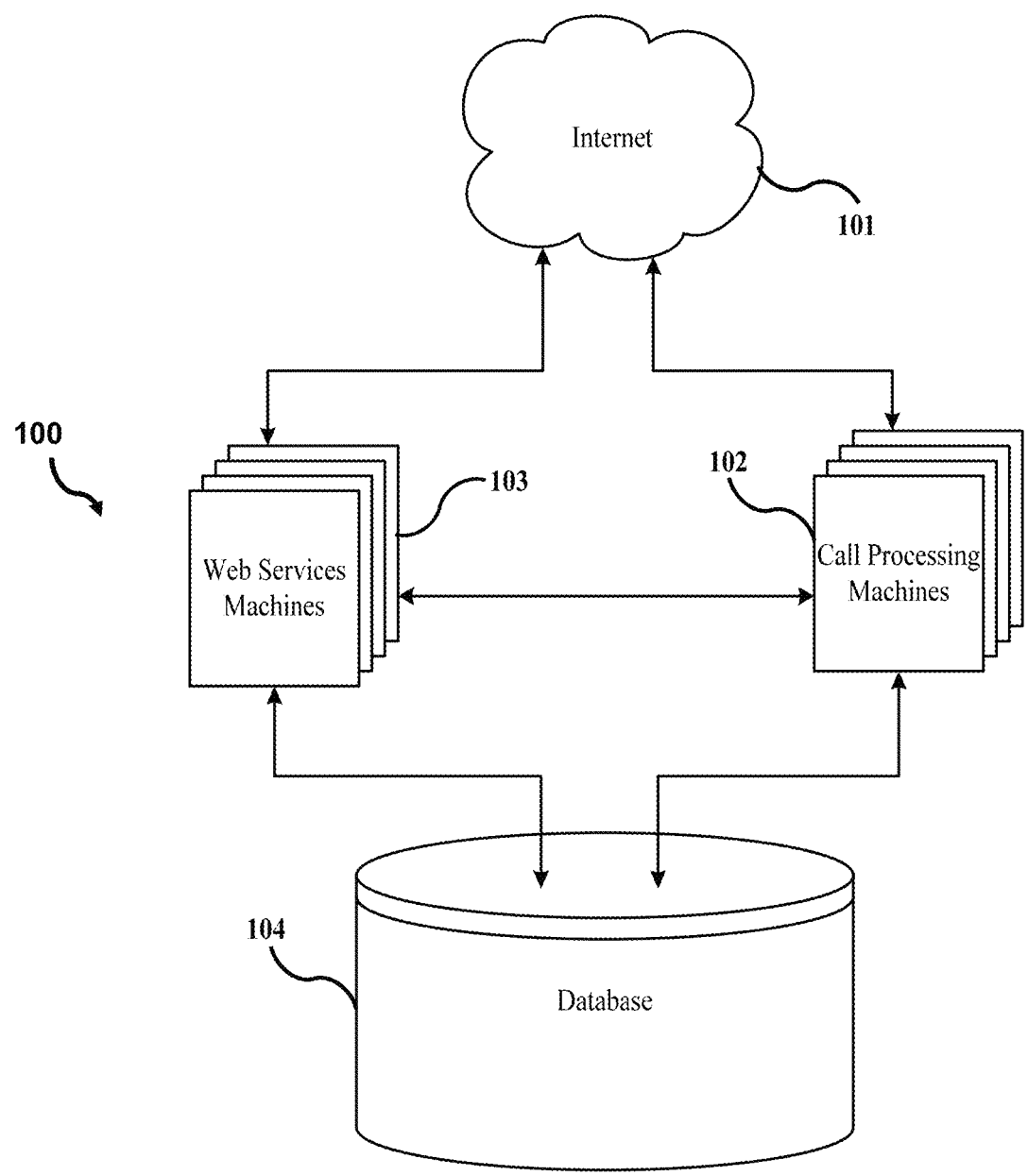
FIG. 1 is a block diagram illustrating a system for processing and indexing audio data or calls in a searchable database in accordance with an embodiment of the present invention.

FIG. 1 shows a block diagram illustrating a system for processing and indexing audio data or calls in a searchable database in accordance with an embodiment of the present invention.

In embodiments, the speech-to-text system includes one or more call processing machine(s) 102 and web service machine(s) 103. The call processing machine(s) 102 provide continuous processing of call data obtained from various data sources (not shown), such as telecommunication providers, call centers, law enforcement, etc., and place the resulting indexed data into a database or database array 104. In embodiments, the system comprises a single or multiple databases or database arrays. The database 104 may be located locally, may be part of the call processing machine 102, or may be connected remotely via Internet 101. The web service machine(s) 103 provides users, administrators, or others with a user interface that allows them to access to the system and perform various searches of the database(s). The web service machine(s) 103 may be a system administrator computer located in the same facility as or remote to the call processing machine(s) 102 and/or database 104. The web service machine(s) 103 and call processing machine(s) 102 may be integrated into a single machine, such as 102 or 103.

The system controller may comprise a network of computers or servers. In other embodiments, the system controller may comprise a single computer or server. Processing resources may be scaled based on load. The system controller may be based in the cloud (public or private). The system may also be deployed on dedicated or shared hardware in a traditional data center. For example, in various embodiments, for improved security and performance it may be advantageous for users to access the system through web service machine(s) 103 that are separate from the call processing machine(s) 102. In some embodiments, such as smaller systems where call volume is limited, it may reduce cost or management overhead to combine call processing and web services on a single server or set of servers. An exemplary embodiment of the components of the call processing machine 102 and/or web services machine 103 is disclosed in FIG. 13.

Figure 2:
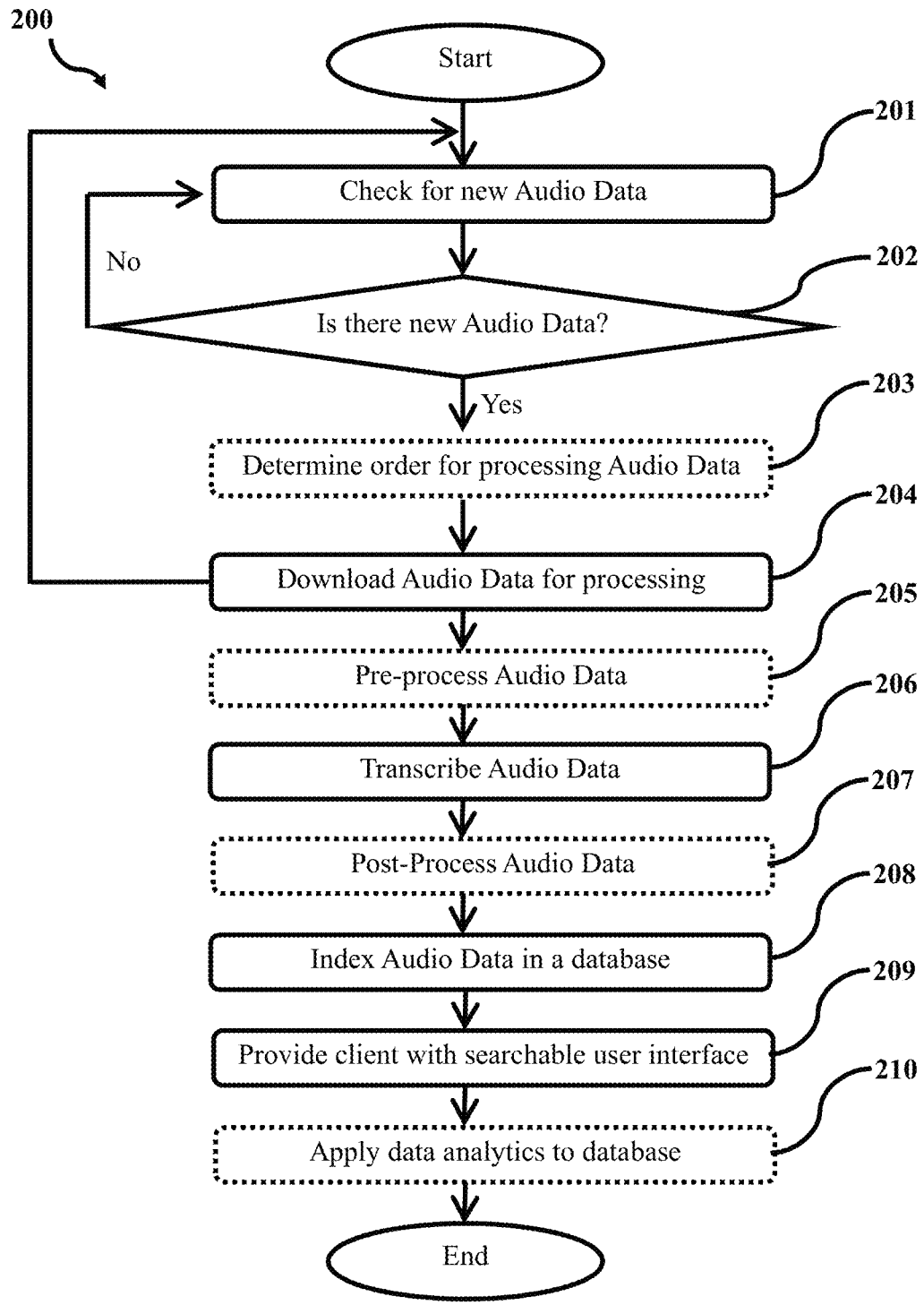
FIG. 2 is a flow chart illustrating a method for processing audio data and indexing the audio data in a searchable database in accordance with an embodiment of the present invention.
Figure 13:
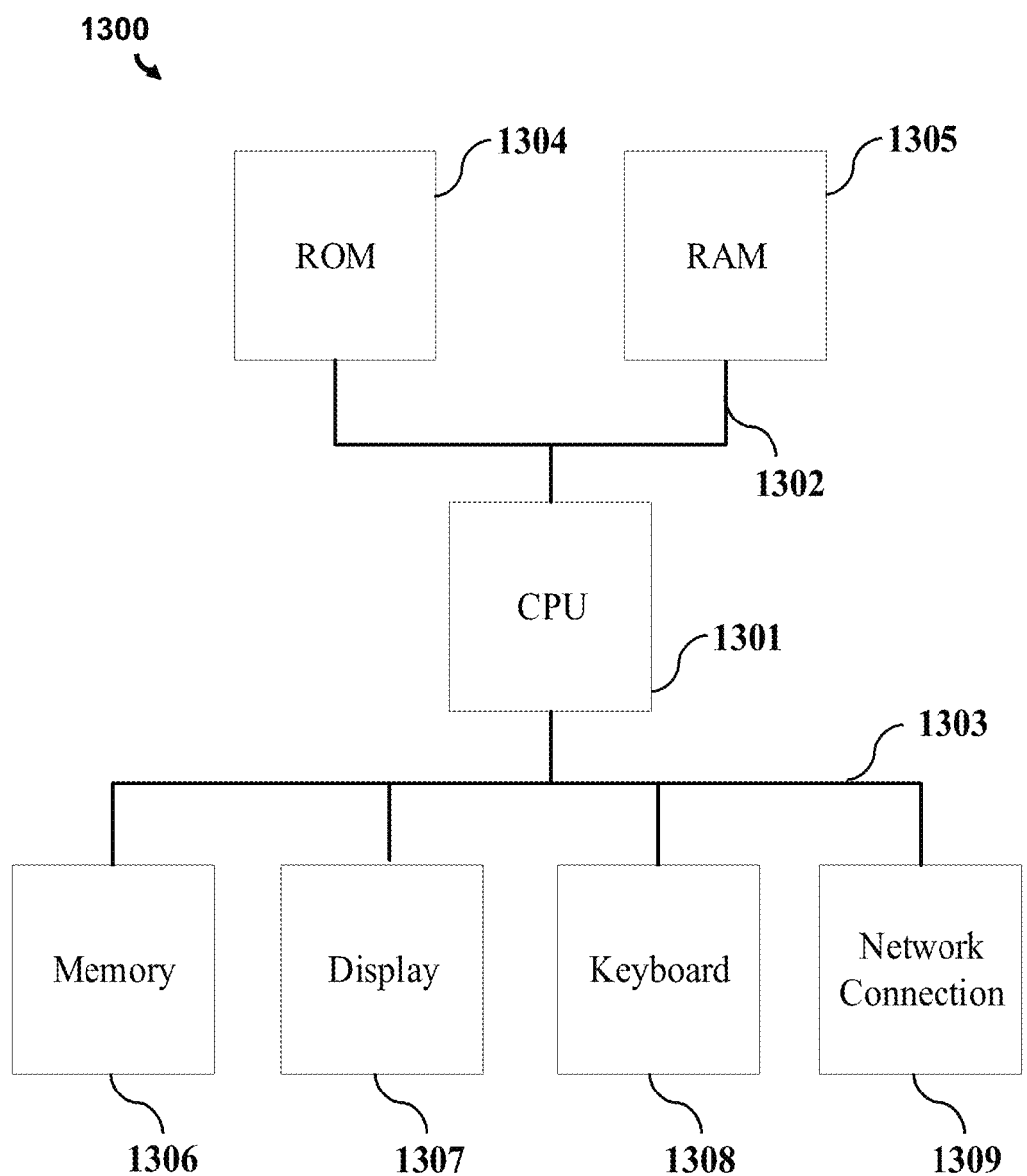
FIG. 13 is a block diagram illustrating an exemplary computer system.

FIG. 2 shows a flowchart demonstrating a method 200 for processing audio data and indexing the audio data in a searchable database in accordance with an embodiment of the present invention. The method 200 can be implemented using one or more software components executing on one or more systems such as call processing machine(s) 102 and/or web processing machine(s) 103 (which may be implemented on one or more computer systems such as shown in FIG. 13).

Referring to FIG. 2, in a step 201, the speech-to-text system determines if new audio data is available from a data source. The system may periodically retrieve the audio data from a repository. Audio data may also be periodically pushed to the system of the present invention. For example, the data source(s) stores audio data and metadata in a repository and provides a pointer to the system. The data source may include a telecommunication provider, a law enforcement entity, a call center for a company, and the like. The data source may comprise a server or storage containing audio data. For example, a client may upload audio data onto a server and provide the speech-to-text system with access to the data. In another embodiment, the client may transfer the audio data directly into database 104. Audio data may be automatically provided to the speech-to-text system for processing real-time, near real-time, or for later processing.

The speech-to-text system may generate an index to track audio data from the data source. For example, the index may indicate which audio data has previously been detected, which is currently in queue to be downloaded and/or processed, and which has already been downloaded or processed. The index may be used to determine if new audio data is available to be downloaded from the data source. The list may comprise metadata related to audio data. The speech-to-text system may check routinely or continuously for new audio data form the data source.

In step 202, if no audio data is available, the method moves back to step 201. The speech-to-text system may delay for some increment of time before returning to step 201. If new audio data is detected, the method moves to step 103 and determines the order for downloading and/or processing audio files. For example, the speech-to-text system may determine a priority level for calls based on call data or call metadata. For example, priority may be based on the data source, the name of the caller or callee, the length of the call, the data source, and/or other criteria. In embodiments, audio data may be downloaded and then priority may be assigned by the system for processing the audio data. For example, the system may assign preferences and determine the order in which audio data is downloaded and/or processed. For example, the audio data may be queued in a first in, first out format, or a last in, first out format. In embodiments, audio files may be queued first based on priority level, and then according to a first in, first out or a last in, first out format.

At step 204 the speech-to-text system downloads the audio data, if necessary, for processing. The audio data may include the audio file(s) as well as metadata related to the audio file(s). Metadata may include, without limitation, billing information, caller and callee identification, caller and callee phone number, priority, the data source, the date, and call start time and end time, audio length. The audio files may be downloaded first into a local buffer or directly into database 104. Multiple files comprising audio data can be downloaded in parallel. For example, multiple phone calls comprising audio data and metadata may be downloaded simultaneously from an audio source such as a telecommunications provider.

In step 205 the speech-to-text system pre-processes the audio data. Pre-processing of data may be desirable prior to transcribing the audio data for a variety of reasons. For example, the speech-to-text system may rely on a third party to transcribe audio data into a text transcript. The transcriber may have restrictions on what types of audio data the transcriber is able to process, so the speech-to-text system may pre-process audio data to meet the requirements of a transcriber. For example, the transcriber may not be able to process a 2-channel audio track. Pre-processing may comprise separating audio data into separate files for transcription. For example, where call audio data comprises a 2-channel audio track, the speech-to-text system may separate the data into two separate audio files. For example, the audio data for each speaker in a two person conversation may be separated into two audio files so that each speaker can be transcribed individually. In embodiments, the transcriber may only be able to process certain audio formats. For example, the transcriber may only be able to process in a particular file format, such as .wav. The speech-to-text system may convert audio data into an audio format suitable for transcription. For example, in some embodiments the speech-to-text system may convert audio files between formats including .wav, h.264, AAC, MP3, FLAC, MIDI, or others. A transcriber may only be able to process audio data of a certain size, and pre-processing may comprise splitting audio data for a single call into multiple smaller files prior to processing. The audio data may not require any pre-processing prior to transcribing the audio data. For example, the audio data may be formatted such that the transcriber can process the audio data without any pre-processing. The transcriber can also perform pre-processing.

In step 206 the speech-to-text system transcribes the audio data. The speech-to-text system may transcribe the audio data to a text transcript. As discussed above, the speech-to-text system may rely on a third party transcription service to transcribe audio data into a text transcript. For example, the speech-to-text system may upload audio data to a transcription service's server. The transcription service may provide a text transcript of the file to the speech-to-text system. The speech-to-text system may monitor the transcription progress and track the transcription of every audio data. The transcription service or the speech-to-text system may assign an identification number or other identifier to each audio file that is transcribed. The identifier may be used for tracking the transcription process. The speech-to-text system may periodically request status from the transcription service. The transcriber provides metadata to the speech-to-text system. For example, the transcriber may provide timestamps for each word in the transcript. The transcriptions may also be performed locally.

In step 207 the speech-to-text system optionally post-processes the resulting transcription. For example, it might be desirable to combine multiple transcripts of audio data. For example, if a 2-channel audio track was separated prior to transcription, the transcripts may need to be combined after transcription is complete. The speech-to-text system may stitch transcripts together to align with the audio file interleaving, which may include timestamp information. In embodiments, stitching the transcripts together may produce a single transcript with both speakers represented. For example, some transcripts may include timestamps for each word, phrase, or the like. Where a transcript reflects noise such as inaudible overlapping speech or noises, the speech-to-text system may use methods to remove the noise. Post-processing may not be required. The audio data may be formatted such that the transcriber may produce a final text transcript that does not require post-processing.

In a step 208 the speech-to-text system indexes the audio data, based on, for example, the caller's name or phone number, the callee's name or phone number, data source, and the like. In embodiments, indexing may be based on metadata provided by a telecommunications provider or metadata provided by the transcription service. In embodiments, the speech-to-text system indexes based on the content of the full text or based on particular fields of the transcript. The transcript and audio data may be linked in the database. The speech-to-text system stores the indexed audio data in a database or on a server. For example, where the audio data is stored in a buffer or temporary memory while it is being processed, the speech-to-text system may index and store the file in a database. The database may be stored in permanent memory of a computer or server.

In a step 209 the speech-to-text system provides the client with a searchable user interface. The searchable interface may be provided to users through the Internet. For example, the user interface may be accessible through a web browser or through an application on a personal computer, laptop, mobile device, or any of a number of devices connected to the Internet.

The user interface may show various details about call data. For example, the user interface may display the call time, caller name and phone number, callee name and phone number, call duration, and status indicators for its progress in the processing pipeline (audio download, transcription available, call completed, etc.). The user can choose which fields to display and can establish default settings or profiles for which fields to be displayed. The user interface may allow a user to view the processing status of audio data that is currently processing. The transcript may be shown separated by speaker or channel.

A user may be able to save search queries or filters. In embodiments, a user may request updates if new audio data is processed that matches certain search or filter criteria. For example, the system can also allow the user to automatically generate alerts for users as calls are added to the database by matching certain criteria such as keywords, caller name, callee name, etc. The system can automatically generate alerts via the user interface, by email, or the like.

The user interface may display calls that match particular filters or search criteria. For example, key words may be entered into a search bar to search for particular content. The user interface may provide keyword or field level filters that allow a user to view the details of a call that match search conditions. The list of calls matching the search criteria may be displayed based on a user's search. Filters may be selected to limit what information is displayed. For example, filters could limit search results based on a date range or minimum or maximum length for the call. The user interface may also allow a user to filter call data by caller or callee name or other metadata values. For example, the user interface may support searching for single terms or a combination of terms in the transcript. The user interface may display a result count and search details. Search terms may be highlighted in the text transcripts where the search term appears.

The user interface may comprise different viewing screens and viewing options. A user may select a single view, toggle between different views, or have multiple windows open with different views. For example, a user may have one window open displaying a table view of search results (e.g., a list of calls from same caller or callee), and a second window open displaying detailed information about a single call. As a user clicks on an entry in the table view, details about the selected call populate the second window. The call data can be displayed in the user interface in a table or each call may appear as a thumbnail object.

The system may provide various default views for the user interface such as calendar view, search view, and call view. The calendar view may present call data in chronological order. The calendar view may include calls that are still being processed and may display the status of processing for each call. The search view may present call data based on a user's search criteria. The search view may only include call data for calls that have been processed and indexed, and may not display the status of processing for each call. The search view may comprise various filters that can be used to narrow search results. The call view may present detailed call data for a particular call. In call view, a transcript area and audio areas may be synchronized. The audio bar may present the audio waveform for multiple channels of audio and allow "scrubbing" back and forth in the audio. As a user scrubs back and forth in the audio file the text transcript may scroll accordingly so that the transcript area remains synchronized with the relevant portion of the audio file.

In step 210 the speech-to-text system may apply data analytics to the processed audio database. Data analytics can include counts of calls completed, calls failed, and/or calls without pickup, broken down by caller, phone used, block, or floor of a facility, and by call time. Data analytics can include such analysis as new words found in transcripts not entered into the formal lexicon used for semantic indexing of transcripts. Data analytics can include providing tags onto call summary views for all formal lexicon matches that occur in the transcript to aid users in determining the value of a call while still on the summary screen. Data analytics can include assessing the frequency of calls made to a party or phone number from one or more individuals in a facility to highlight relationships between individuals, entities, phone numbers, and external events or police records. An example of such is locating multiple individuals in a facility calling a number shortly after booking and inferring a group/gang connection between the individuals or if already known to the phone number called. It can also be used to identify calls made from within a facility to witnesses or victims of an incident with the intent of intimidation or tampering. Data analytics can include use of word usage, patterns of speech, and frequency to identify individuals with similar linguistic influences or to identify artificial speech patterns that can imply use of coded language or sub-culture affiliation.

The system may provide default views for managing lexicon content (words, synonyms, aggregation hierarchy) as reflected in U.S. Pat. No. 9,858,260, which is fully incorporated herein by reference, but used in the context to direct the data analytics of phone call transcripts and metadata. The system may provide views of call statistics (calls made, failed, unanswered) by selection of facility, flow, block, phone, or individual. Such statistics may be views at various granularities (year, month, week, day, hour, day of week, hour of day) to identify any patterns of behavior of the individuals or equipment. The system may provide views for observing the frequency of words not covered by the formal lexicon with visual emphasis based on frequency of use. The system may provide views showing connections between individuals, outside phone numbers, and other individuals with optional display of details about the calls involved in such connections.

Figure 3:
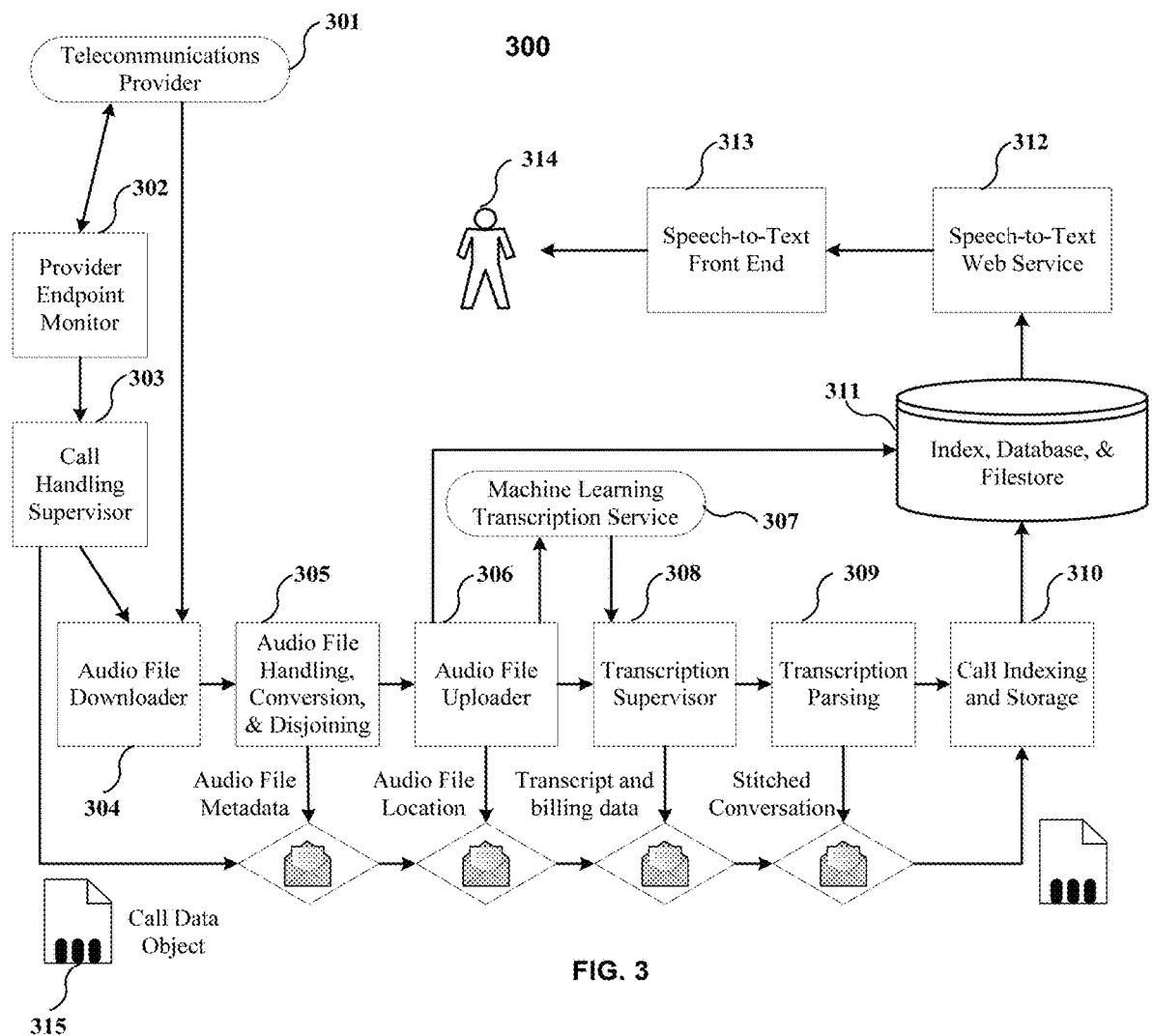
FIG. 3 is a logic diagram illustrating a system for processing and indexing audio data or calls in a searchable database in accordance with an embodiment of the present invention.

FIG. 3 comprises a logic diagram for processing and indexing audio data or calls in a searchable database in accordance with an embodiment of the present invention. The processes of the logic diagram can be implemented in one or more software components, working as a single unit and/or as separate processes, executing on one or more hardware platforms, an exemplary of which is shown in FIG. 13. Referring to FIG. 3, a telecommunications provider 301 (or other entity or facility recording the calls and metadata) may provide access to a list of phone calls and a means to obtain the audio files for the calls. This can be provided, for example, by storing the phone calls and associated audio files in a repository and providing a pointer to the system. In one embodiment, the list of phone calls includes metadata such as call time, originating call number and number called, priority information, and the associated account data with the caller or number called. In one embodiment, the audio is provided in a single file containing audio in 2 channels with one channel for each speaker. In another embodiment, the audio may be provided in a plurality of related files. Furthermore, the audio files can be queued in a first in, first out format. In another embodiment, the audio files are queued first based on priority level, then according to FIFO mechanism. Priority can be based, for example, on the calling number, called number, time of day, and/or other criteria.

A provider endpoint monitor 302 loops through obtaining the list of phone calls passing all new data to the call handling supervisor 303. The call handling supervisor 303 tracks the progress of each call in the system that is being processed. The supervisor 303 and monitor 302 may operate concurrently and independent of each other. A new call handling supervisor 303 may be created for each call found by the provider endpoint monitor 302. The supervisor 303 may track the activity of the other components in processing the call and retains the call data object 315. The call data object 315 may store in storage the audio file metadata, audio file location, transcript and billing data, and final transcript for each call data that is processed.

The audio file downloader 304 spawns processes to download the audio files (e.g., from a central repository for a particular source) for calls obtained by the provider endpoint monitor. In one embodiment, the audio file downloader 304 puts the audio files in a local buffer. In another embodiment, the audio file downloader 304 transfers the audio files in a database 311 (local or remotely located) and/or queue. These calls can be downloaded in parallel. The call handling supervisor can also assign priority to the audio files.

The audio file from the telecommunications provider may be in a format that is incompatible with that required by the transcription service 307, or the transcription service may only be able to process one channel of audio. As needed, the audio file handling component 305 may separate two audio channels into separate audio files or convert the audio to a format suitable to the transcription service. The audio files may already be in a format that is suitable to the transcription service. An exemplary embodiment of audio handling 305 is disclosed in FIG. 6.

In one embodiment, the audio file uploader 306 transfers the audio files generated from each call from a local buffer to a storage used by the transcription service. Once an audio file has uploaded, the transcription service 307 is requested to perform the transcription by the transcription supervisor 308. In embodiments, the system spawns a transcription supervisor 308 for each file being transcribed. The transcription supervisor 308 monitors the transcription service's progress and upon completion retrieves the transcript text data and any metadata for the transcript. This can be one for each channel in the case where the transcription service only supports single channel audio, and one per call when the transcription service supports dual channel audio.

Once both halves of a phone call have completed transcripts, the transcription parser 309 component stitches them together to align with the audio file interleaving. This produces a single transcript with both speakers represented. An exemplary embodiment of transcription parser 309 is disclosed in FIG. 8. Alternatively, if the transcription service 307 can accept 2 channel audio files directly then conversion, separation, and stitching is not required outside that service.

Once the combined transcript is available it is stored and indexed by the call indexing and storage 310 and placed in the database 311. Indexing might be based on caller/callee number, caller/callee number, metadata provided by telecommunications provider, metadata provided by the transcription service, and full text indexing on the content of the transcript. In one embodiment the transcript and audio file are also linked in the database.

Once a completed transcript is indexed and stored in the database 311, the web service 312 can be used to locate transcripts by a user 314. The speech-to-text front end 313 provides interactive access to the web service 312. In embodiments, the speech-to-text system user interface may supports searching for terms or a combination of terms in the transcript or filtering by caller/callee number or metadata values.

Figures 4, 5:
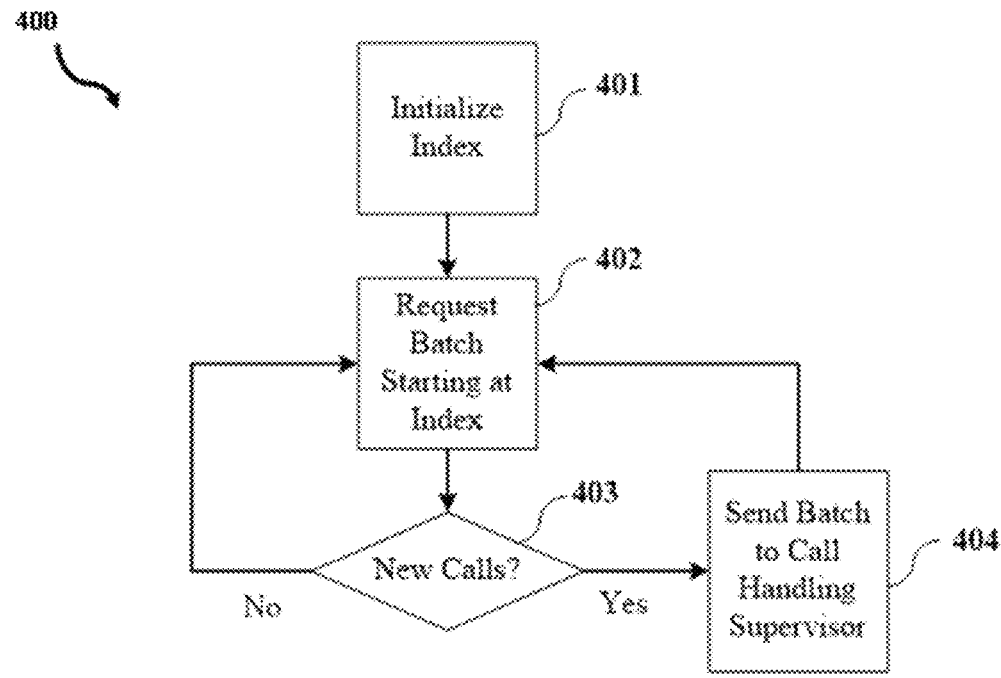
FIG. 4 is a flow chart illustrating a method for tracking when new audio data becomes available for download from a data source in accordance with an embodiment of the present invention.
FIG. 5 is a flow chart illustrating a method for tracking the processing of audio data in accordance with an embodiment of the present invention.

FIG. 4 is a flow chart illustrating a method for tracking when new audio data becomes available for download from a data source in accordance with an embodiment of the present invention. Referring to FIG. 4, in step 401 the provider endpoint monitor 302 initializes an index to begin tracking data from the telecommunications provider 301. The index is used to track call data and determine if new call data is available from the telecommunications provider 301. In step 402 the endpoint monitor 302 requests data from the provider 301. The endpoint monitor 302 may receive a list of call data (caller number, callee number, account data, call duration and audio file id) from the telecommunications provider 301. In step 403, if data is available, it is forwarded to the call handling supervisor 303. The endpoint monitor 302 continuously or periodically loops back to step 402 and again requests data from the telecommunications provider 301. Audio files may be downloaded first into a local buffer or directly into database 104 (311).

FIG. 5 is a flow chart illustrating a method for tracking the processing of audio data in accordance with an embodiment of the present invention. Referring to FIG. 5, in step 501 the call handling supervisor 303 receives call metadata from the endpoint monitor 302. In step 502 the supervisor 303 tracks the downloading of the call data. In step 503 the supervisor 303 receives audio metadata. In step 504 the supervisor 303 receives the audio location from the transcription service 307 upon successful upload of the audio file. In step 505 the supervisor 303 receives the raw transcript and billing data from the transcription service 307 after transcription is complete. In step 506, if required the supervisor 303 receives the stitched transcript. For example, step 506 may not be necessary if the transcription service 307 can process a 2 channel audio file without requiring the file to be parsed into separate files for each audio channel. In step 507 the supervisor 303 monitors the storage and indexing of the transcript, audio data, and metadata in the database. In embodiments, the supervisor 303 stores the transcript, audio data, and metadata in the call data object 315.

Figure 6:
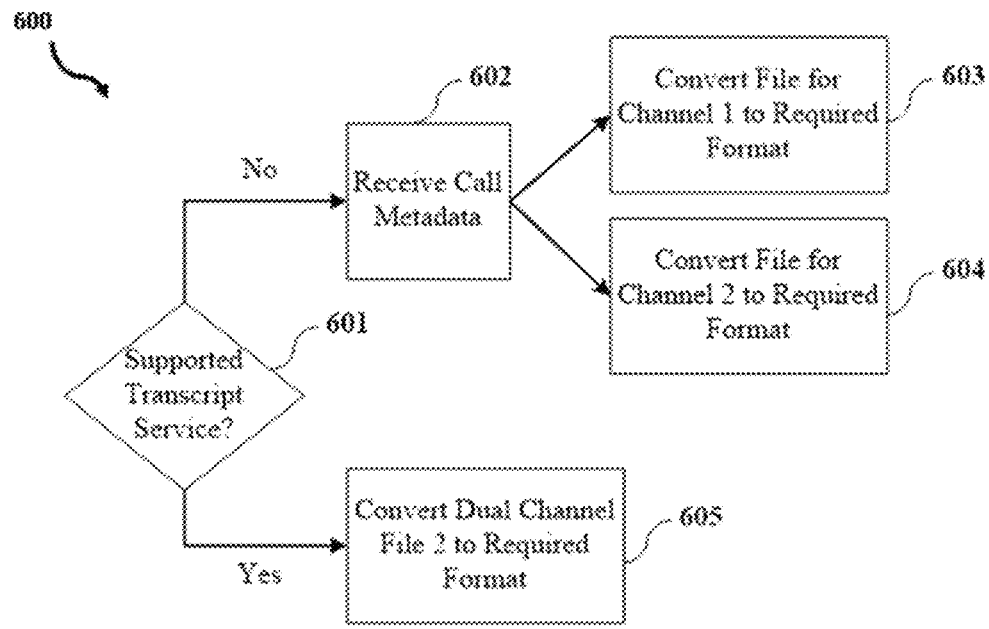
FIG. 6 is a flow chart illustrating a method for pre-processing audio data in accordance with an embodiment of the present invention.

FIG. 6 is a flow chart illustrating a method for preprocessing audio data in accordance with an embodiment of the present invention. Referring to FIG. 6, in step 601 the system determines whether the transcription service 307 can transcribe a 2 channel audio file. If the transcription service 307 is able to transcribe a 2 channel audio file, in step 605 the system converts the file format if necessary to prepare the audio file for transcription. If the transcription service 307 is unable to transcribe a 2 channel audio file, in step 602 the system splits the audio file into two separate audio files, one for each channel. And if necessary in steps 603 and 604 the system converts the audio format for each audio file resulting from step 602 to prepare the audio file for transcription.

Figure 7:
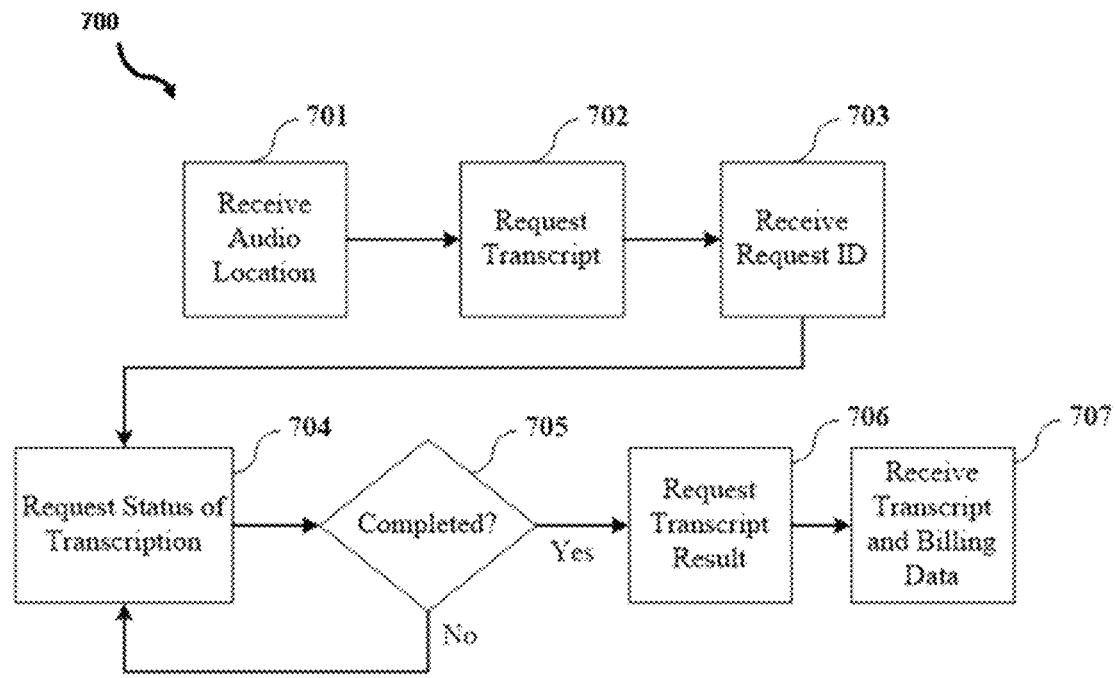
FIG. 7 is a flow chart illustrating a method for supervising transcription of audio data or calls in accordance with an embodiment of the present invention.

FIG. 7 is a flow chart illustrating a method for supervising transcription of audio data or calls in accordance with an embodiment of the present invention. Referring to FIG. 7, in step 701 the transcription supervisor 308 receives the audio file location. In step 702, the transcription supervisor 308 submits the request for transcription that indicates the relevant audio file location from step 701. In step 703 the transcription supervisor 308 receives a request identification. In step 704 and 705 the transcription supervisor continuously or periodically requests the status of the transcription from the transcription service 307. Once the transcript is complete, the transcript text is requested in step 706 and the transcript data and billing data are received in step 707.

Figure 8:
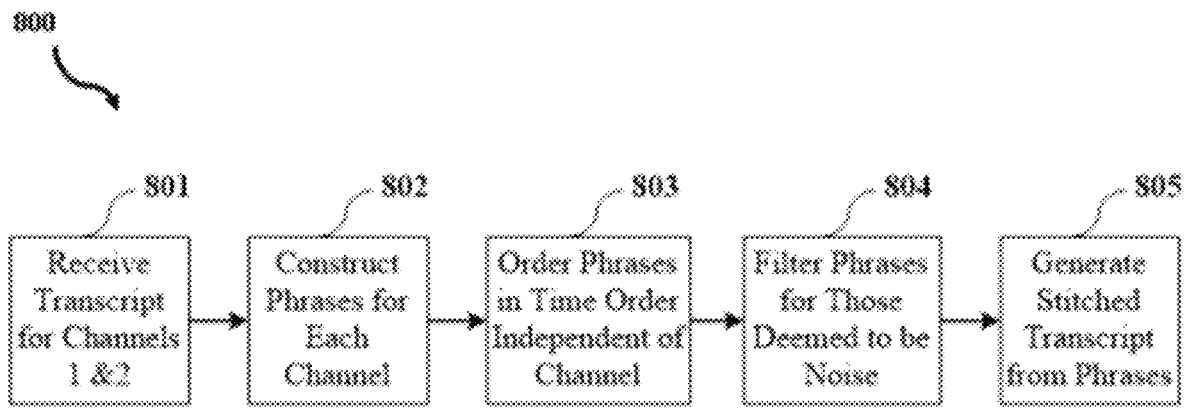
FIG. 8 is a flow chart illustrating a method for combining multiple transcripts of audio data in accordance with an embodiment of the present invention.

FIG. 8 is a flow chart illustrating a method for combining multiple transcripts of audio data in accordance with an embodiment of the present invention. Referring to FIG. 8, in step 801 the transcript parser 309 component receives the transcripts for each of the 2 channels of audio from the transcription supervisor 308. These transcripts include either phrase or word level time stamps, and the textual transcript data for each phrase or word. If the transcription service 307 is at the word level it may construct phrases in step 802 by looking at word timing and judging when the speaker breaks at the end of a phrase. Alternatively, in step 802 it may construct phrases based on the grammar of the speaker's language, or based on word order pairings. In step 803, once phrases are constructed they may be sorted for time order independent of channel. In step 804 the transcript parser 309 component may filter out noise. Noise can consist of short utterances overlapping the other speaker, or short phrases that do not appear to comply with grammar or contain insufficient meaning to appear intentional (acknowledgement phrases for example). In step 805 after filtering is complete the final stitched transcript is produced.

Figure 9:
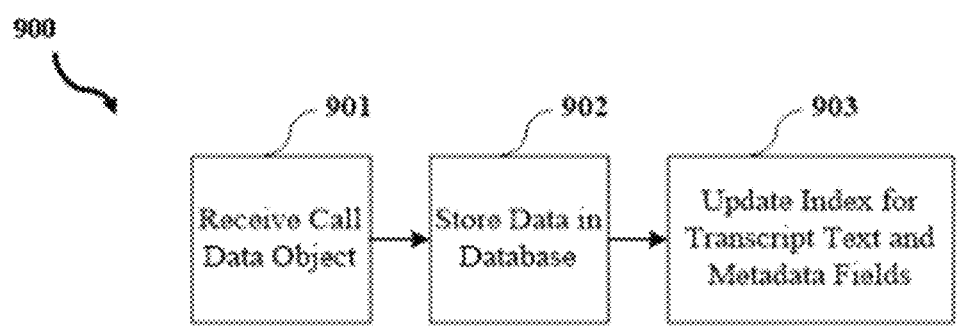
FIG. 9 is a flow chart illustrating a method for storing and indexing audio data in accordance with an embodiment of the present invention.

FIG. 9 is a flow chart illustrating a method for storing and indexing audio data in accordance with an embodiment of the present invention. Referring to FIG. 9, in step 901 the call indexing and storage component 310 receives the call data object 315 which may include transcript and call data. The call data object 315 may further comprise the relevant audio file or a pointer to the audio file (for example, if the audio file is already stored in database 311). In step 902, the object 315 is then stored in the database, and in step 903 the data is indexed. In step 903 the data may be sent to an indexing service for additional text and field level indexing.

Figure 10:
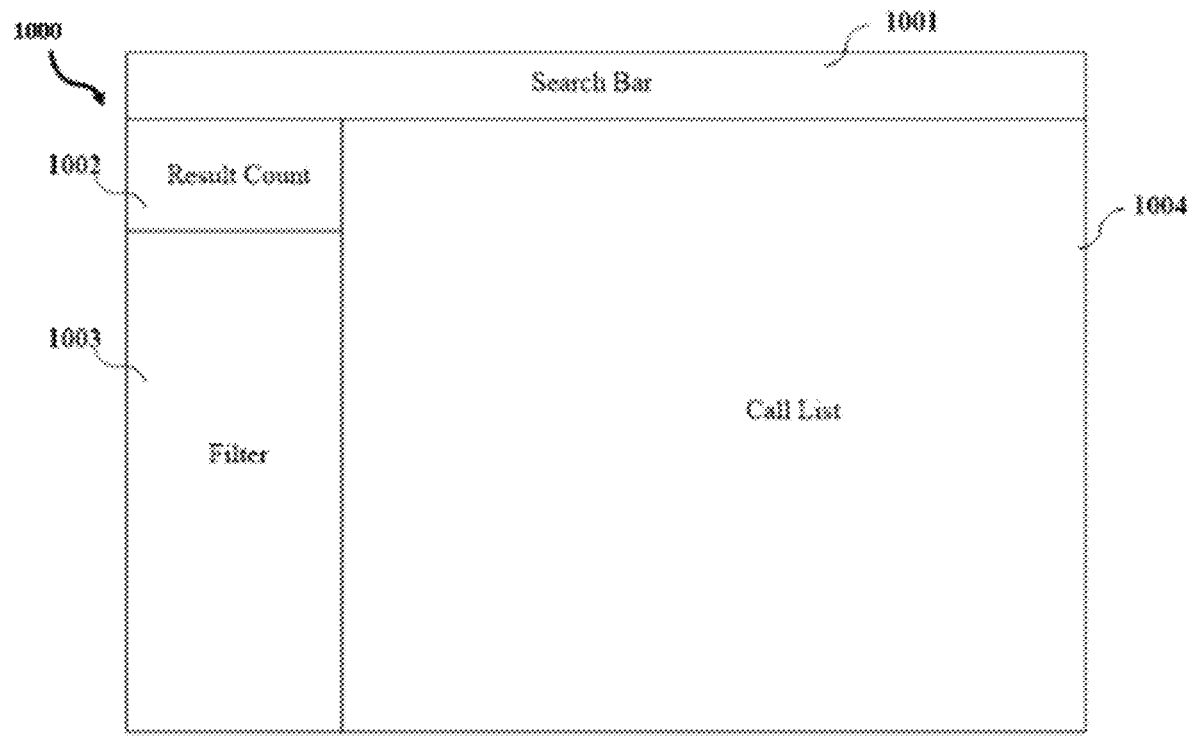
FIG. 10 is a block diagram depicting a call list user interface in accordance with an embodiment of the present invention.
Figure 11:
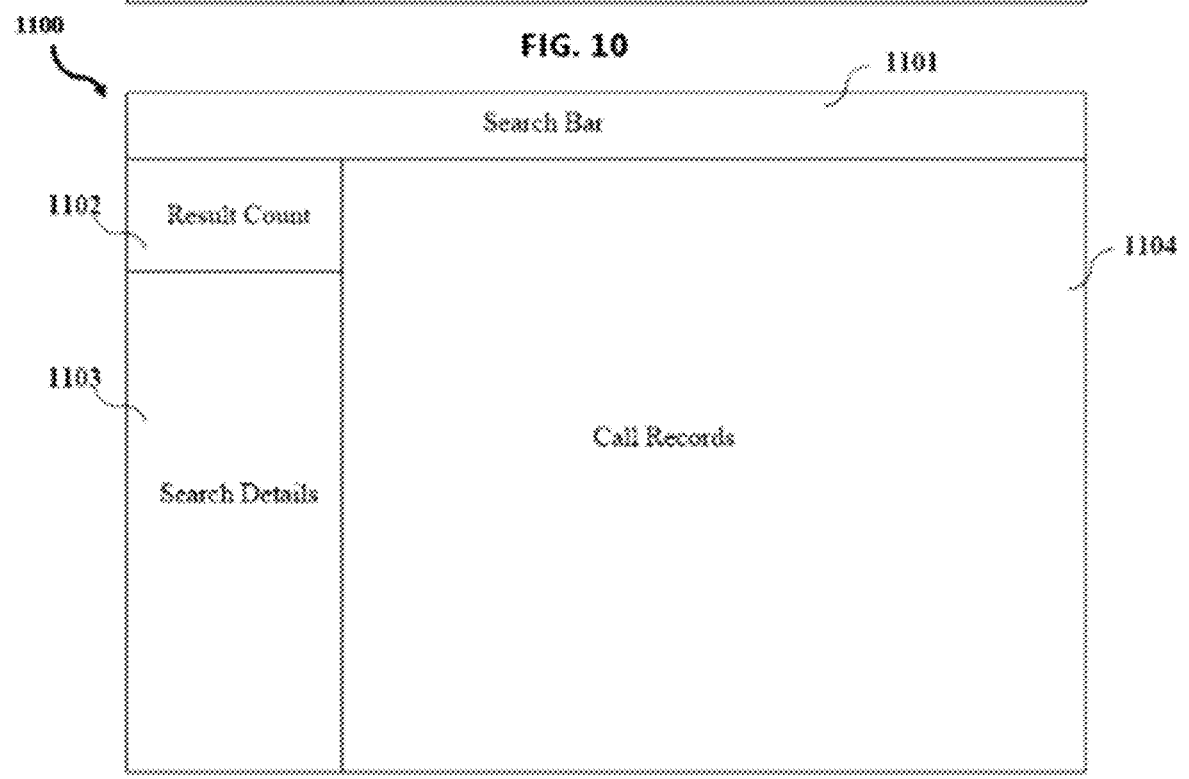
FIG. 11 is a block diagram depicting a search user interface in accordance with an embodiment of the present invention.

FIGS. 10-12 illustrate an exemplary embodiment of the speech-to-text system's user interface. FIG. 10 is an exemplary block diagram depicting a call list user interface. Referring to FIG. 10, the call list user interface 1000 allows the user to view the chronological call list with status and summary information. In some embodiments, a user can filter that data by caller/callee, by keywords, by date time, by status, and the like. The keyword filter is entered in the search bar 1001, the filter conditions are selected in the filter area 1003, the matching record count is shown 1002, and the list of matching call summaries are shown in a list 1004. Each record in the list shows the call time, caller/callee, duration, and status indicators for its progress in the processing pipeline (audio download, transcription available, call completed, etc.).

FIG. 11 is an exemplary block diagram depicting a search user interface. Referring to FIG. 11, the search user interface 1100 provides an alternate view for users to locate calls that match their search criteria. Results are sorted by relevance to the search conditions. Search criteria are shown in place of filters. Results may be shown as cards rather than rows, and contain metadata presented as a form rather than a table, without the status display of the calendar view. Search conditions are entered in the search bar 1101. The search user interface further comprises the result count 1102, search details 1103, and records 1104.

Figure 12A:
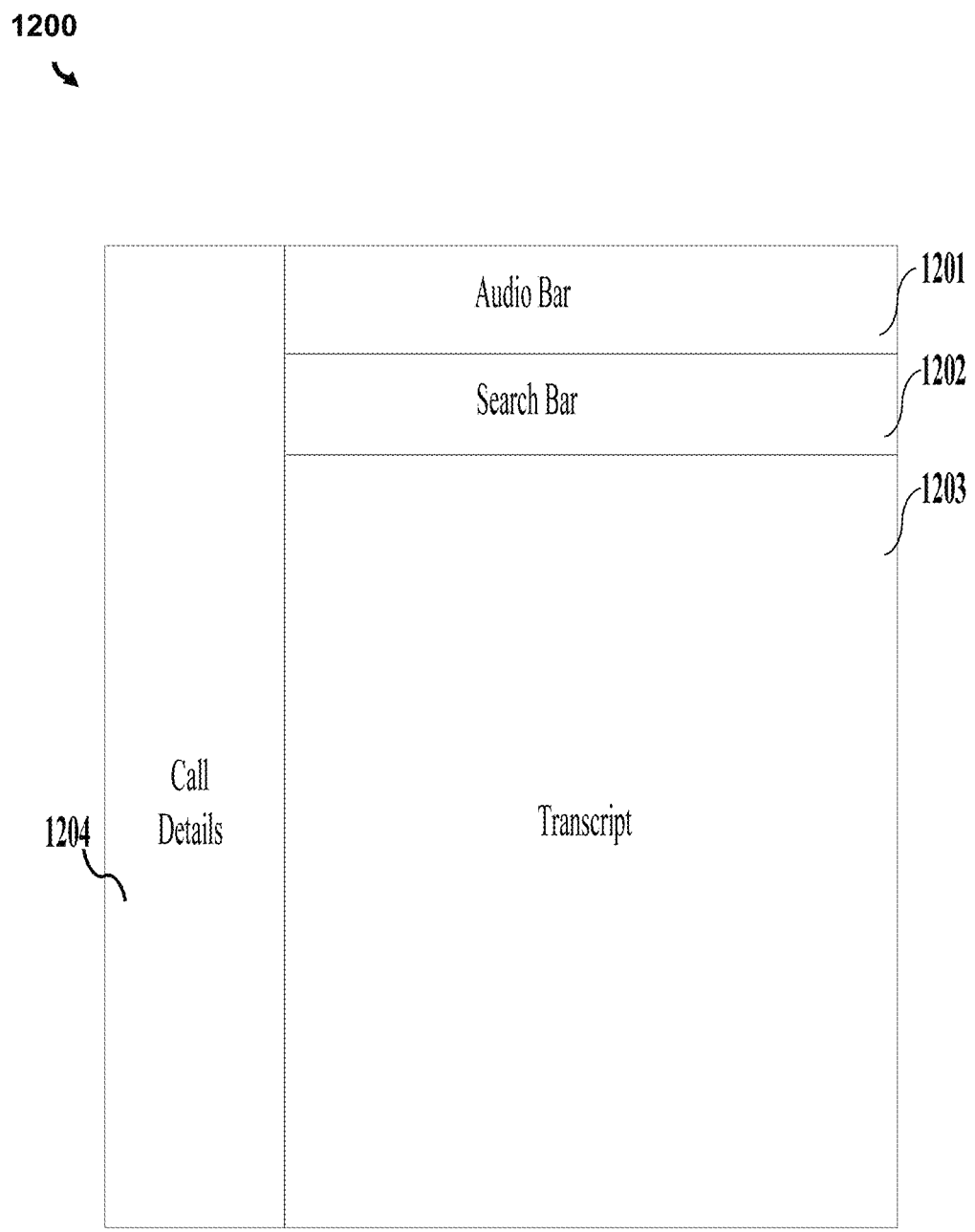
FIG. 12A is a block diagram depicting a call detail user interface in accordance with an embodiment of the present invention.

FIG. 12A is an exemplary block diagram depicting a call detail user interface. Referring to FIG. 12A, the call detail user interface 1200 displays call details about a single call. The audio bar 1201 presents the audio wave form for both channels of audio and allows "scrubbing" back and forth in the audio. The call details (metadata and search matches if any) are presented 1204, and the transcript is shown separated by speaker (channel) in the transcript area 1203. The user can search the transcript for text 1202 causing both the transcript 1203 and audio bar 1201 to scroll to the matching text. In addition to text search matches, search criteria that led to the call detail can be highlighted in the transcript. In embodiments, two or more calls may also be displayed in a comparison call detail user interface.

Figure 12B:
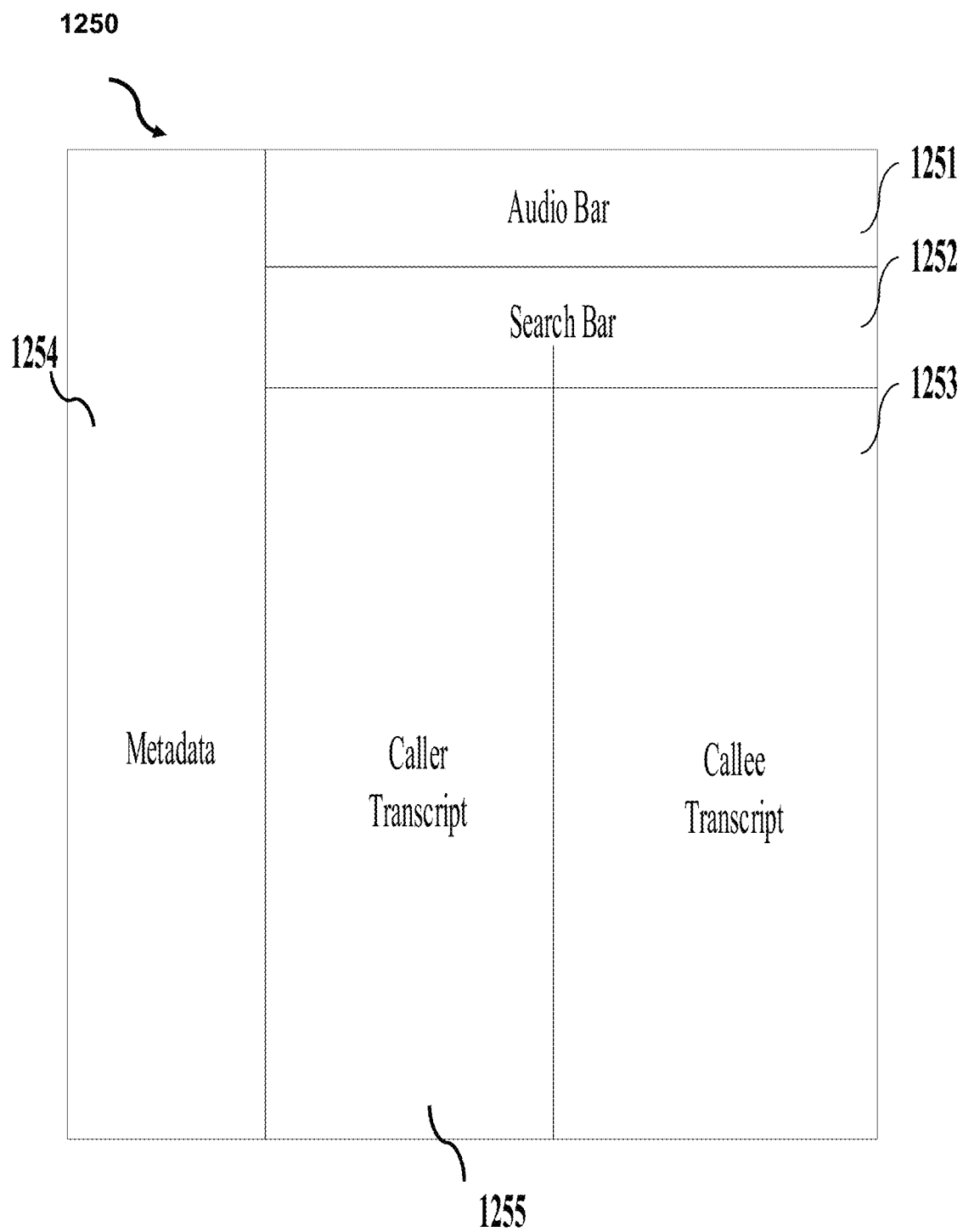
FIG. 12B is a block diagram depicting a comparison call detail user interface in accordance with an embodiment of the present invention.

FIG. 12B is an exemplary block diagram depicting a user interface corresponding to a call between two individuals, such as an inmate and a third party. Referring to FIG. 12B, the transcript interface 1250 displays side-by-side transcripts for the caller 1255 (such as an inmate in a correctional facility) and callee 1253 (a third party). For example, the caller transcript 1255 may comprise the transcript of the channel of a call corresponding to an inmate in a prison, and the callee transcript 1253 may comprise the transcript of the channel of the call corresponding to a callee speaking to the inmate through a phone at the prison or remotely. The audio bar 1201 allows the user to playback audio while reviewing the transcript. The metadata is presented in frame 1254. For example, metadata for a prison phone call may include the name of the inmate, the time and date of the call, and the phone number or name of the callee. In embodiments, the system of the invention can record the conversation, automatically generates textual transcripts from the call and the associated metadata, and makes the resulting data searchable and available on a user interface, such as that shown in FIG. 12A in real-time or near real-time. The system can be configured to generate an alert based on any user setting, such as, for example, the caller information, callee information, keywords from the transcripts, and the like. By processing the data quickly and providing law enforcement with a notification, the information can be used to help detect criminal activity in real time. The user can search the transcript for text 1253, 1255 and search hits can be highlighted in the transcript. Searches can be saved so notifications will be sent to the user if the specified conditions are met in a future call. The user interface can also include or load information on several related calls between the caller and callee.

FIG. 13 is an exemplary block diagram depicting the components of a computer system for implementing the present invention. Multiple of such computer systems may be utilized to implement the present invention. The computer system may be a server, personal computer, terminal, tablet, mobile smartphone and/or combinations thereof. In embodiments, call processing machine 102 or web services machine 103 comprise a computer system 1300 (as shown in FIG. 13). The configuration of the processing system in each speech-to-text system may vary. Referring to FIG. 13, the computer system 1300 includes a central processing unit (CPU) 1301. CPU 1301 is a processor, microprocessor, or any combination of processors and microprocessor that execute instructions stored in memory to perform an application. CPU 1301 is connected to a memory bus 1302 and Input/Output (I/O) bus 1303.

A non-volatile memory, such as read only memory (ROM) 1304, is connected to CPU 1301 via memory bus 1302. ROM 1304 stores instructions for initialization and other system commands of processing system 1300. A volatile memory such as random access memory (RAM) 1305 is also connected to CPU 1301 via memory bus 1302. RAM 1305 stores instructions for all processes being executed and data operated upon by the executed processes. DRAM and SRAM may also be used as a volatile memory, and other memory caches or memory devices (not shown) may be connected to memory bus 1302.

Peripheral devices may include memory 1306, display 1307, I/O device 1308, and network connection device 1309 that are connected to CPU 1301 via I/O bus 1303. I/O bus 1303 carries data between the device and CPU 1301. Memory 1306 may include external data storage such as an external hard drive or USB drive. Display 1307 is a monitor or display and associated drivers that convert data to a display. I/O device 1308 is a keyboard, a pointing device or other device that may be used by a user to input data. Network device 1309 is a wireless network card or a modem or Ethernet card that connects processing system 1300 to a network.

Figure 14:
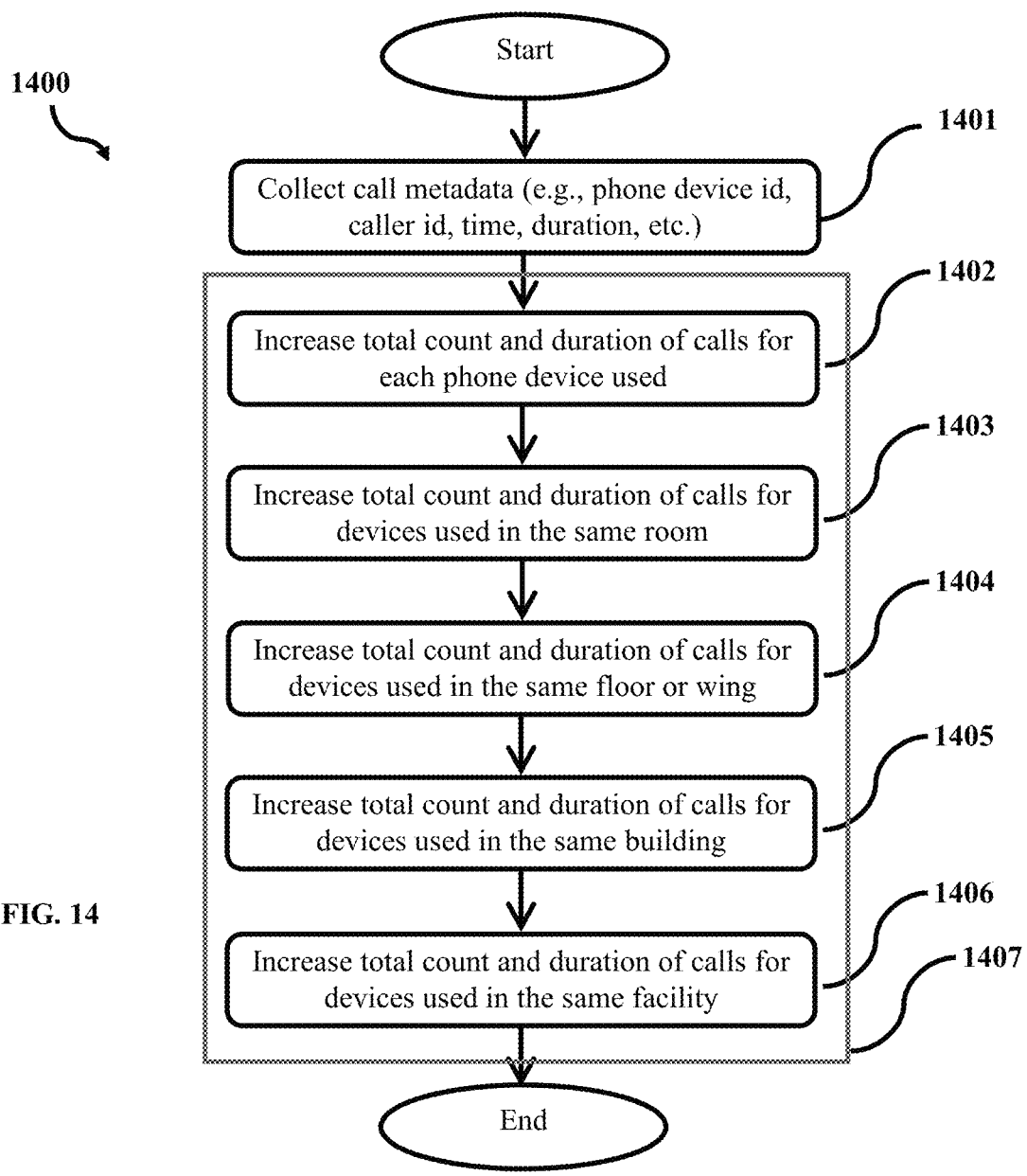
FIG. 14 is a flowchart illustrating a method for tracking call data in accordance with an embodiment of the present invention.

FIG. 14 is a flowchart illustrating a method for tracking call data in accordance with an embodiment of the present invention. Referring to FIG. 14, at step 1401, information is collected from each call processed by the system in order to create the data analytics regarding call frequency and duration by location, time, and user, for example. The information can be stored in the database. At step 1402, the running total and total duration of all calls using that phone device is computed. At step 1403, the running total and total duration of all calls for devices in the room the call originated from is computed. At step 1404, the running total and duration of all calls for devices on the same floor, unit, or wing (or other designated area) as the call is computed. At step 1405, the running total and duration for all calls for devices in the same building as the call is computed. At step 1406, the running total and duration for all calls in the same facility as the call is computed. In one embodiment, the values calculated and tracked in Steps 1401 to 1406 are stored as separate entries in a database. Steps 1402-1406 are repeated (shown as 1407) to compute the overall totals, total for the same date as the call, same day of the week as the call, and same hour as the call, and for calls made by the caller making the call. The results of these computations can be a) stored in a database keyed by the date, hour, caller, day of week, floor, building, room, facility, phone id, or number called, or b) stored in memory (e.g., RAM, Flash, etc.) within a server, or within a data streaming system. A user interface, such as a dashboard, can access the database and display data for one or more such entries by providing the request filters (range of rooms, hours, etc.). Many different filter permutations can be applied to this data and displayed using the Dashboard. For example, this information can assist in determining whether the volume and duration of calls has gone up or down during a particular period of time, by phone, floor, building, facility, etc. This information can also be used to determine the number of calls an inmate has made, whether the inmate has made calls outside of the inmate's cell block, the length of calls over time, etc. The system can also set and generate triggers to alert the system administrator when certain conditions are met, such as when the call volume and/or duration reaches a threshold, etc.

Figure 19:
FIGS. 19-22 are exemplary screenshots of the Dashboard user interface according with exemplary embodiments disclosed herein.
Figure 20:
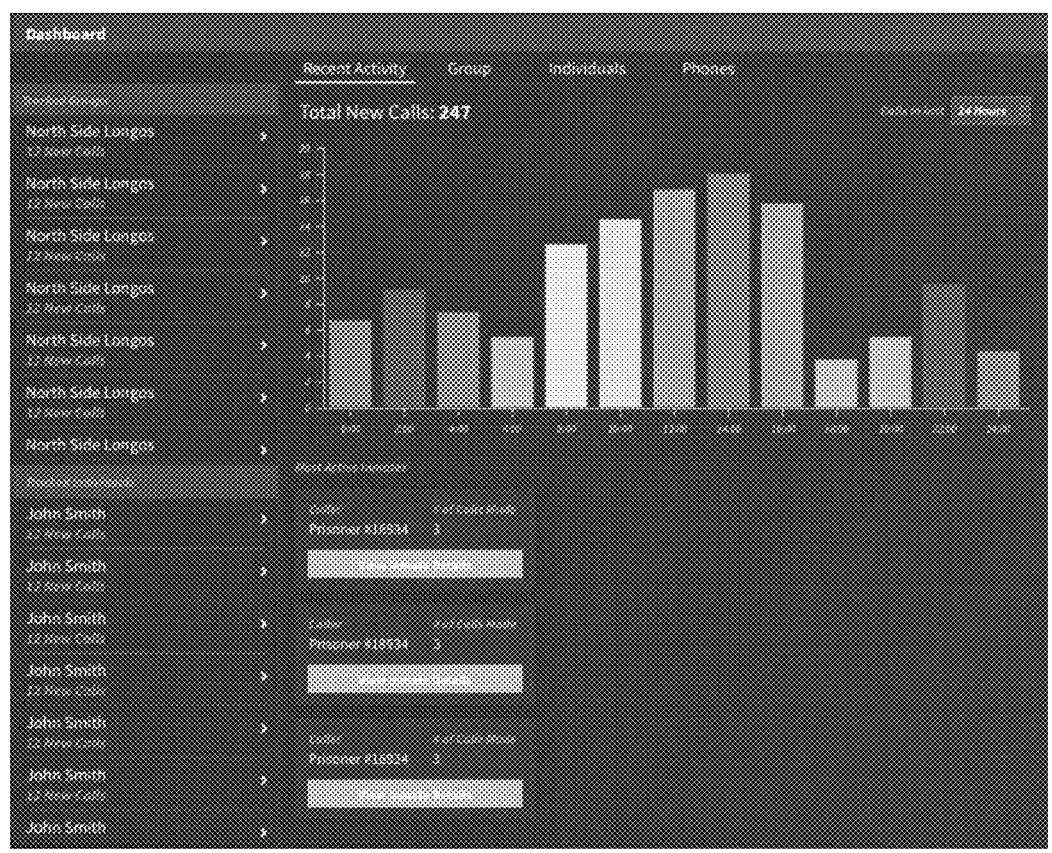
Figure 21:
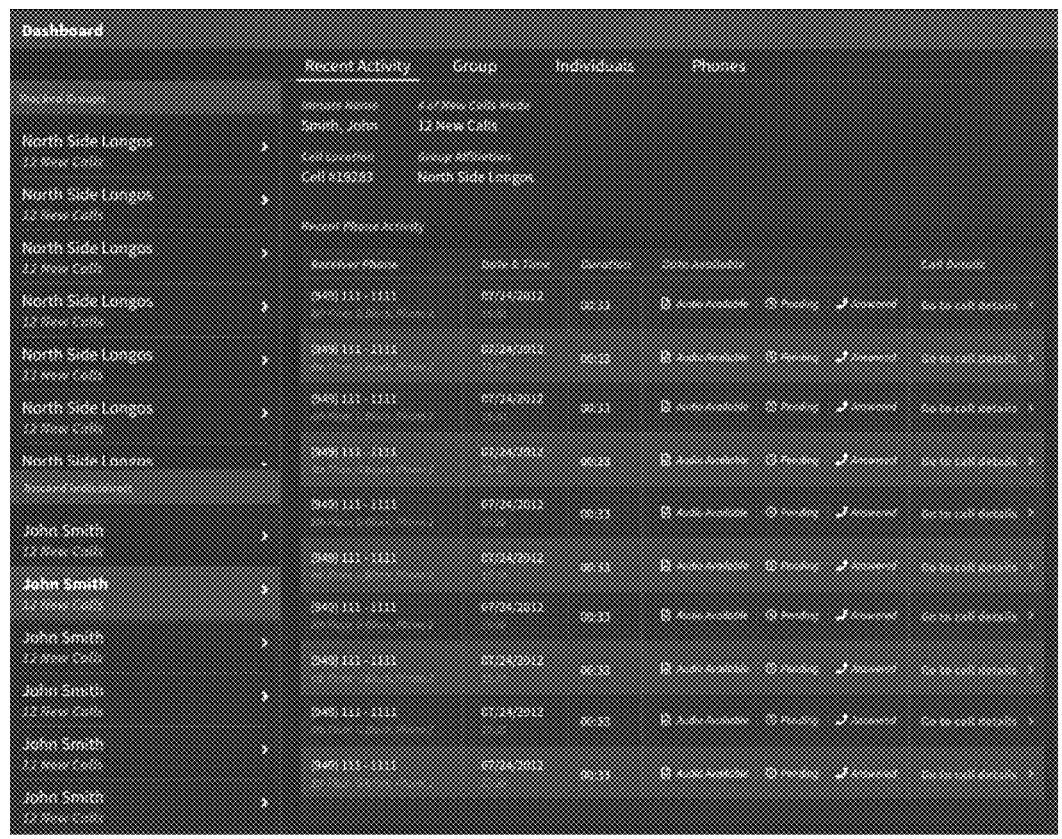

FIGS. 19-21 are exemplary screenshots of the Dashboard for tracking calls of a facility, e.g., a correctional facility. Referring to FIG. 19, the screenshot shows a graph of the total aggregated calls over a one week period. FIG. 19 also shows a total of 47 calls made on phone 3 located in Block B on the first floor and the average duration of such calls. The data underlying the graphs and details in the Dashboard are obtained from the one or more databases. In this screenshot, an administrator can monitor the number and average duration of calls made on a particular telephone in the facility.

FIG. 20 shows another exemplary screenshot of the Dashboard having different fields. For example, FIG. 20 shows a bar graph of the total number of calls over a 24 hour period. FIG. 20 also shows details tracking selected inmates, groups of inmates, and most active inmates. FIG. 21 shows yet a further exemplary screenshot of the Dashboard which tracks details of calls made by a particular inmate, including the number of the third party called, the duration, etc. Clicking on the "Go to call details" button will bring up a different screen on the Dashboard that will have the transcript of the call, a link to the audio, and a search field, for example, as shown in FIG. 12A. The data underlying the Dashboard is obtained from the one or more databases.

Figure 15:
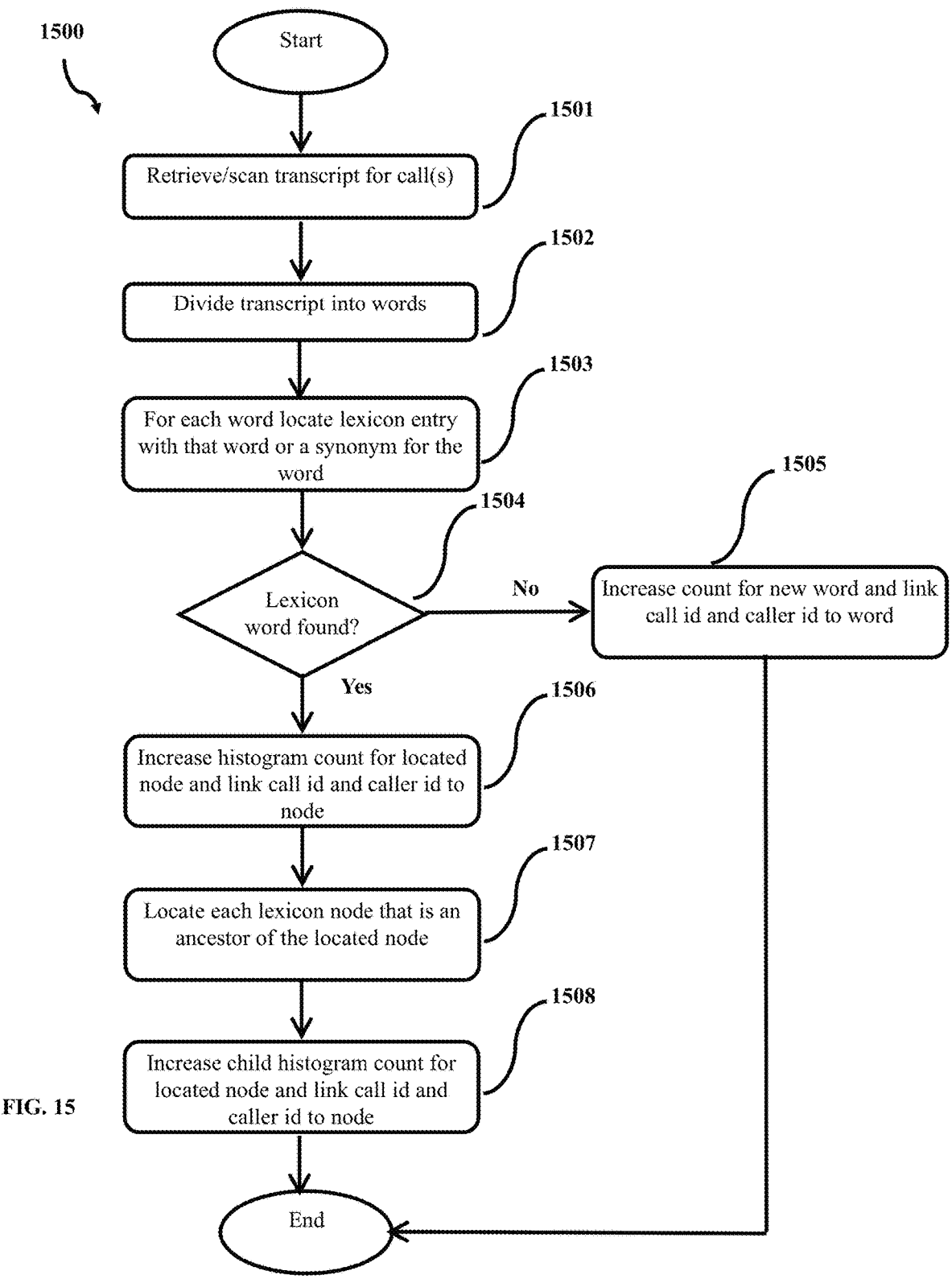
FIG. 15 is a flowchart illustrating a method for tracking and creating a semantic index of calls and word usage in accordance with an embodiment of the present invention.
Figure 22:
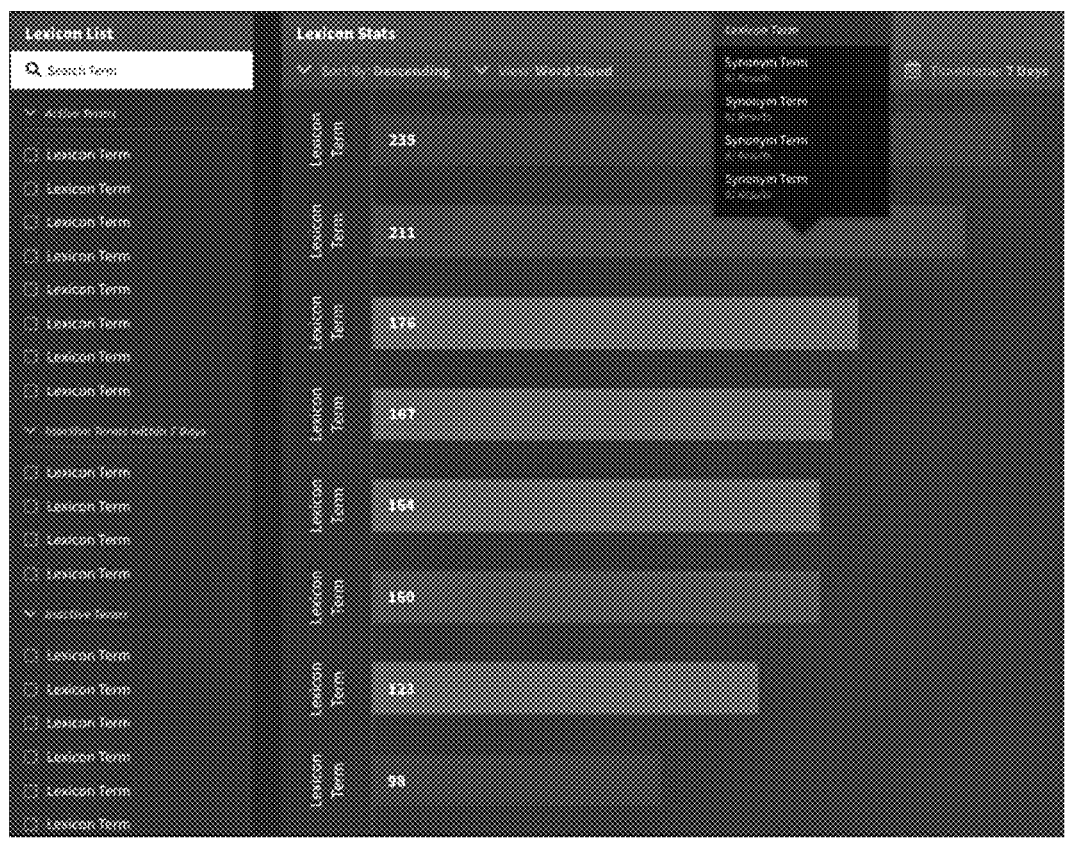

FIG. 15 is a flowchart illustrating a method for tracking and creating a semantic index of calls and word usage in accordance with an embodiment of the present invention. Referring to FIG. 15, at step 1501, the method retrieves and/or searches the transcript text for each call (or a selected set of calls). At step 1502, the method subdivides each transcript text into words. Steps 1503-1508 are repeated for each word. At step 1503, the system locates an existing lexicon node with the word and/or as a synonym for that node. If no such node is found, in step 1505, the word is recorded as a new word and the call id and caller id are associated with that entry. This allows analysts to review new words for inclusion in the lexicon, and to access their use in context of calls and the callers making such calls. In step 1506, the histogram entry for the lexicon node is updated to reflect its occurrence in the call. At step 1507, all ancestor lexicon nodes of the node is located, and at step 1508 their histogram entries for the word's occurrence in the call is updated. The semantic index can be created by caller id, call id, and device id. By creating a semantic index, an administrator of the system using a dashboard can perform various searches for particular words or patterns of words. For example, searches can be performed for particular words (e.g., "gun" or other weapon), or to detect the mood or psychology of inmates. FIG. 22 shows an exemplary screenshot of a Dashboard that shows, among other things, the most common words and/or synonyms used by a selected group (e.g., entire population, floor, wing, unit, affiliation, etc.) over a seven day period. Other fields are shown including a search field. The data underlying the screenshot is obtained from the one or more databases.

Figure 16:
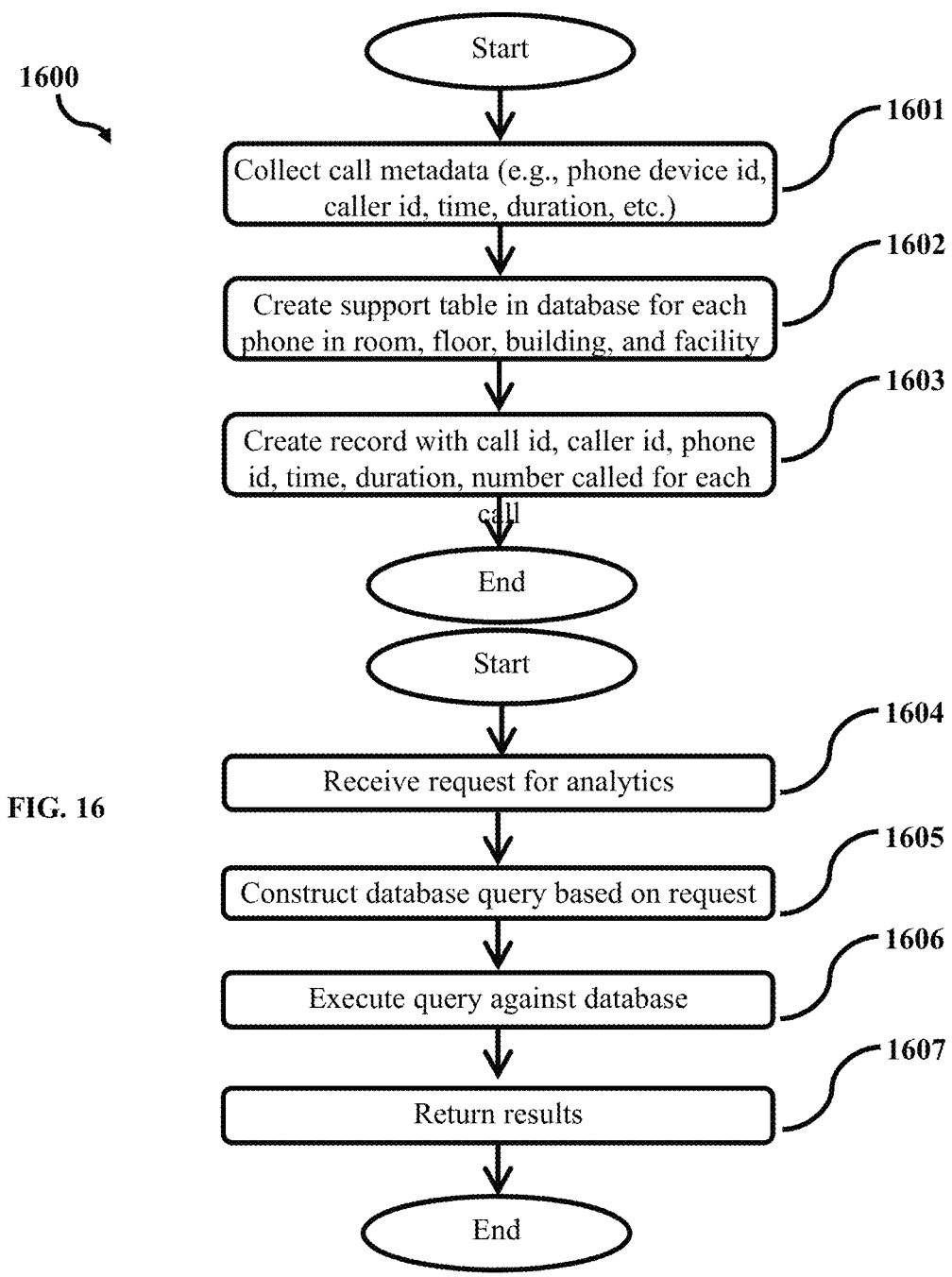
FIG. 16 is a flowchart illustrating an alternate method for tracking call data by phone location, time, and user in accordance with an embodiment of the present invention.

FIG. 16 is a flowchart illustrating an alternate method for tracking call data by phone location, time, and user in accordance with an embodiment of the present invention. Referring to FIG. 16, two flows are shown: the first is the collection of data as calls are processed (steps 1601-1603) and the second is the processing for analytic data requests, e.g., at a later time (steps 1604-1607). At step 1601, the method collects the metadata for the analytic flow from the call metadata on each call as it is processed. Such metadata may include caller id, phone or device id, call id, time, and duration. At step 1602, the method creates a support table in the database that maintains a mapping from phone id to each of the location types (room, floor, building, facility) used in the processing step. At step 1603, the method creates a record for each call with data required for the analysis showing call information and phone id. The location table and call record are stored in a database and/or query-able in memory storage. At step 1604, the method receives request parameters (e.g., from an administrator) for the analysis to be performed (filter criteria and aggregation type to perform, for example, grouped by hour, by day, by floor, or filter to a single building or room, etc.). At Step 1605, the method constructs a database query that satisfies the request parameters and joins the call records to the location mapping table. The requested parameters may include one or more of phone id, room floor, wing, building, facility, caller id, time, duration, phone number called, etc. At step 1606, the method executes the query against the database. At step 1607, the method provides the query results (e.g., formatted in particular way) to the requester, which can be viewed in a Dashboard user interface.

Figure 17:
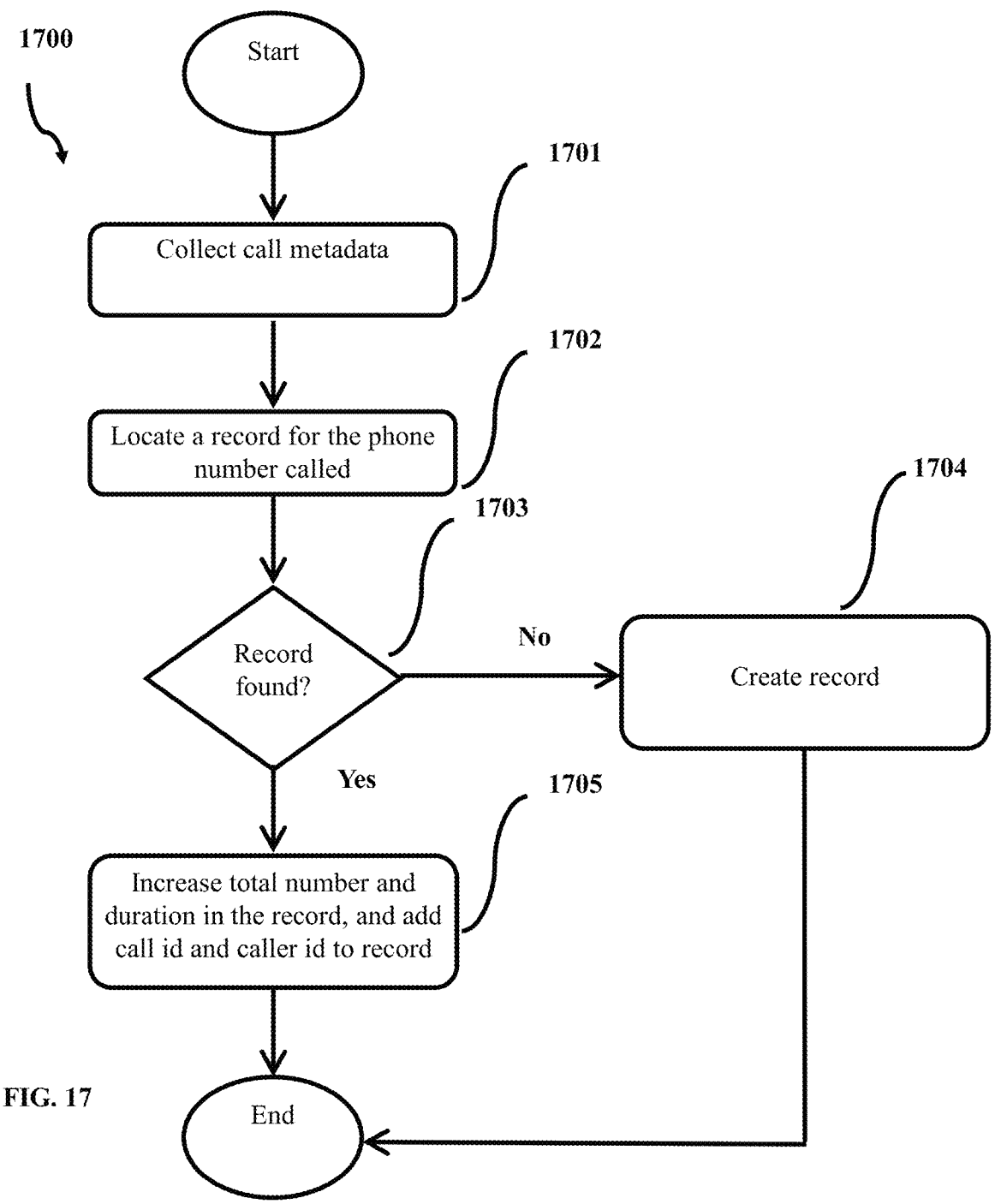
FIG. 17 is a flowchart illustrating a method for tracking the phone call linkages between callers and phone numbers called for call frequency patterns in accordance with an embodiment of the present invention.

FIG. 17 is a flowchart illustrating a method for tracking the phone call linkages between callers and phone numbers called for call frequency patterns in accordance with an embodiment of the present invention. Referring to FIG. 17, at step 1701, the method collects the required fields from each call metadata entry. This includes, for example, caller id, calling party, phone id, call time, and duration. At step 1702, the method locates an existing record for the phone number called. If no such record exists (step 1703) then at step 1704 the method creates the record. At step 1705, the method tracks the total number of calls to that number, the total duration, and a list of calls and caller ids. This data is accessible to the user interface to present to the administrator enabling multiple analysis visualizations including a tree of phone number to callers to other numbers called forming a link analysis graph.

Figure 18:
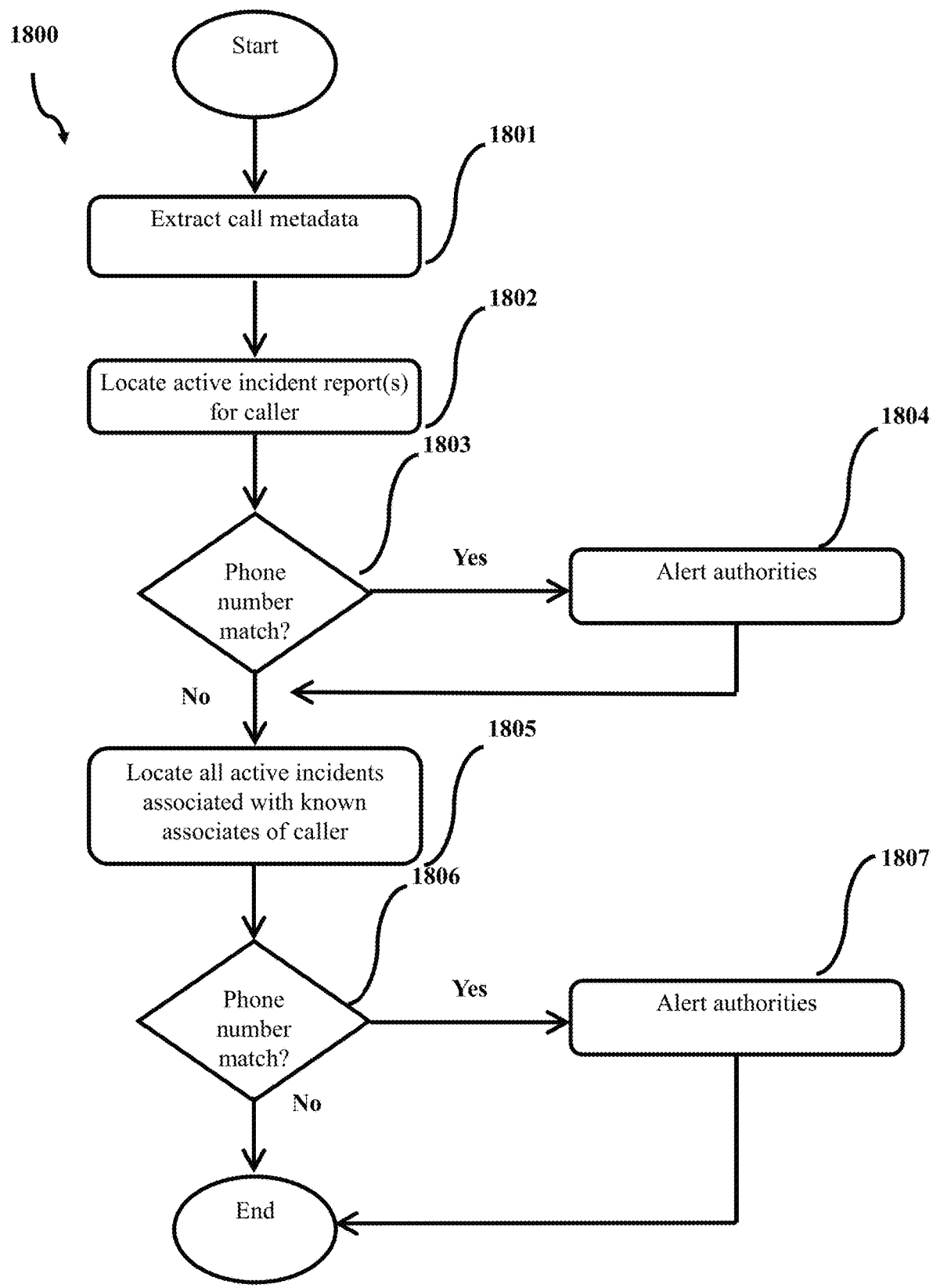
FIG. 18 is a flowchart illustrating a method for tracking the phone call linkages between callers and phone numbers called, for detection of possible intimidation and tampering with witnesses or victims of an incident in accordance with an embodiment of the present invention.

FIG. 18 is a flowchart illustrating a method for tracking the phone call linkages between callers and phone numbers called, for detection of possible intimidation and tampering with witnesses or victims of an incident in accordance with an embodiment of the present invention. Referring to FIG. 18, at step 1801, the method extracts the required metadata for each call, including caller id, phone id, and user. At step 1802, the method locates and/or searches in a database any incidents (investigations, charges, 911 calls, etc.) associated with the caller that are active. At step 1803, the method searches through the incidents for the phone number called (witness, victim, supplier, prosecutor, office, etc.). If matching incidents are found, the officer associated with that incident is notified of the call, at step 1804. At step 1805, the method locates incidents for all known associates of the caller that are active and at step 1806 the method searches for the phone number called. At step 1807, matching incidents generate a notification to the officer in charge of the incident about the call.

What is claimed is:

1. A method of providing a user interface for accessing information related to telephone calls at one or more facilities, comprising:
   receiving a plurality of text-searchable transcripts corresponding to audio calls at said one or more facilities;
   associating metadata with each transcript, said metadata including an ID that identifies a person at said one or more facilities, a phone number associated with a third party, and a call duration;
   storing each of the plurality transcripts and associated metadata in a database;
   creating data analytics by determining running totals of call frequency and duration of said audio calls by location at said one or more facilities; and
   providing said user interface on a display of a computer that has access to said database, said user interface displaying a call list of said audio calls in a field, each call in the call list having access to associated metadata, said user interface further includes one or more fields for searching said database to selectively display a number of audio calls during a particular period of time at a location of said one or more facilities, by one or more keywords, by one or more persons, and by call frequency of said one or more persons.

2. The method of claim 1, wherein said audio calls correspond to telephone calls.

3. The method of claim 1, further comprising:
   recording said audio calls; and
   creating audio files corresponding to said audio calls.

4. The method of claim 1, wherein said step of providing said user interface further comprises selectively displaying a call list based at least in part on said one or more keywords.

5. The method of claim 1, further comprising displaying a transcript of a selected audio call.

6. The method of claim 5 further comprising displaying a link to a selected audio file and providing user controls for fast forwarding or rewinding through said audio file, said transcript highlighting text corresponding to the audio file being played back.

7. The method of claim 1 further comprising displaying side-by-side transcripts of a person and a third party of a call, and associated metadata.

8. The method of claim 1 wherein said one or more facilities comprises one or more correctional facilities.

9. The method of claim 1 further comprising generating an alert based on one or more selected keywords from one or more transcripts.

10. The method of claim 1 wherein creating data analytics comprises storing running totals of call frequency and duration of said audio calls by location at said one or more facilities.

11. An apparatus for providing a user interface for accessing information related to telephone calls at one or more facilities, comprising:
    a display unit;
    storage for storing a database;
    a memory including one or more instructions; and
    a processor coupled to said display, storage and memory, said processor executing said one or more instructions to:
      access said database containing a plurality of transcripts and associated metadata, wherein each transcript is text-searchable and wherein each transcript and associated metadata is based on an audio file of an audio call at said one or more facilities between a person and a third party;
      create data analytics by determining running totals of call frequency and duration of said audio calls by location at said one or more facilities; and
      cause the display unit to display a user interface for displaying a call list of said audio calls in a field, each call in the call list having access to associated metadata, said user interface further includes one or more fields for searching said database to selectively display a number of audio calls during a particular period of time at a location of said one or more facilities, by one or more keywords, by one or more persons, and by call frequency of said one or more persons.

12. The apparatus of claim 11, wherein said audio calls correspond to telephone calls.

13. The apparatus of claim 11, wherein the processor includes further instructions to:
    Cause the display unit to selectively display a call list based at least in part on said one or more keywords.

14. The apparatus of claim 11, wherein the processor includes further instructions to:
    Cause the display unit to selectively display a transcript of a selected audio call.

15. The apparatus of claim 11, wherein the processor includes further instructions to:
    Cause the display unit to selectively display side-by-side transcripts of a person and a third party of a call, and associated metadata.

16. The apparatus of claim 11 wherein said one or more facilities comprises one or more correctional facilities.

17. The apparatus of claim 11, wherein the processor includes further instructions to:
    generate an alert based on one or more selected keywords from one or more transcripts.

18. The system of claim 11 wherein said one or more facilities comprises one or more correctional facilities.

19. A system, comprising:
    one or more databases;
    a call processing computer having a processor and memory, said processor executing one or more software modules located in said memory to:
      receive a plurality of text-searchable transcripts corresponding to a plurality of audio calls at one or more facilities; and
      store each of the plurality transcripts and associated metadata in said one or more databases, wherein said associated metadata includes an ID that identifies a person at the one or more facilities and a phone number associated with a third party;
    a computer having a processor, memory, and display unit, said computer having access to said one or more databases, said computer having one or more software modules to:
      provide a user interface to selectively display one or more transcripts and associated metadata on said display unit;
      create data analytics by determining running totals of call frequency and duration of said audio calls by location at said one or more facilities; and
      cause the display unit to display a user interface for displaying a call list of said audio calls in a field, each call in the call list having access to associated metadata, said user interface further includes one or more fields for searching said database to selectively display a number of audio calls during a particular period of time at a location of said one or more facilities, by one or more keywords, by one or more persons, and by call frequency of said one or more persons.

* * * * *